(12) United States Patent
Stroot

(10) Patent No.: US 9,039,897 B2
(45) Date of Patent: May 26, 2015

(54) METHOD AND SYSTEM FOR TREATING WASTEWATER AND SLUDGES BY OPTIMIZING SCO$_2$ FOR ANAEROBIC AUTOTROPHIC MICROBES

(71) Applicant: Peter George Stroot, Parker, CO (US)

(72) Inventor: Peter George Stroot, Parker, CO (US)

(73) Assignee: University of South Florida, Tampa, FL (US)

( * ) Notice: Subject to any disclaimer, the term of this patent is extended or adjusted under 35 U.S.C. 154(b) by 124 days.

(21) Appl. No.: 13/964,762

(22) Filed: Aug. 12, 2013

(65) Prior Publication Data

US 2013/0327709 A1    Dec. 12, 2013

Related U.S. Application Data

(63) Continuation of application No. PCT/US2012/025237, filed on Feb. 15, 2012.

(60) Provisional application No. 61/443,089, filed on Feb. 15, 2011, provisional application No. 61/487,504, filed on May 18, 2011.

(51) Int. Cl.
*C02F 3/30* (2006.01)
*C02F 3/28* (2006.01)
(Continued)

(52) U.S. Cl.
CPC ............ *C02F 3/2893* (2013.01); *C02F 3/006* (2013.01); *C02F 3/307* (2013.01); *C02F 3/308* (2013.01);
(Continued)

(58) Field of Classification Search
CPC ........ C02F 3/2893; C02F 3/006; C02F 3/307; C02F 3/308; C02F 11/04; C02F 2209/001; C02F 2209/006; C02F 2209/24; C02F 2209/245; C02F 2305/06; Y02E 50/343
USPC ......... 210/603, 605, 610, 614, 621, 623, 630, 210/903, 906
See application file for complete search history.

(56) References Cited

U.S. PATENT DOCUMENTS

| | | |
|---|---|---|
| 4,213,857 A | 7/1980 | Ishida et al. |
| 4,289,625 A | 9/1981 | Tarman et al. |

(Continued)

OTHER PUBLICATIONS

Siripong et al., Diversity Study of Nitrifying Bacteria in Full-Scale Municipal Wastewater Treatment Plants, Water Research, 2007, vol. 41, pp. 1110-1120.
Wagner et al., In Situ Analysis of Nitrifying Bacteria in Sewage Treatment Plants, Wat. Sci. Tech., 1996, vol. 34, No. 1-2, pp. 237-244.
Van Dongen et al., The SHARON(R) -Anammox(R) Process for Treatment of Ammonium Rich Wastewater, Water Science and Technology, 2001, vol. 44, No. 1, pp. 153-160.
(Continued)

*Primary Examiner* — Fred Prince
(74) *Attorney, Agent, or Firm* — Michele L. Lawson; Smith & Hopen, P.A.

(57) ABSTRACT

The present invention describes a method of optimizing $CO_2$ concentration to increase the specific growth rate of Anammox bacteria and methanogens in wastewater and sludge treatment, as well as novel systems and methods of treating wastewater and sludge. The specific growth rate or doubling time of the Anammox bacteria and methanogens were determined to be sensitive to dissolved $CO_2$ concentration. Optimizing dissolved $CO_2$ concentration increases the specific growth rate of the Anammox bacteria, which may be used as an alternative biological nitrogen removal process for the treatment of domestic wastewater. In the method and system of treating sludge, the $CO_2$ stripper returns biogas with low $CO_2$ concentration to the headspace of an anaerobic digester in order to lower the headspace $CO_2$ concentration and therefore, the soluble $CO_2$ concentration. The lower soluble $CO_2$ concentration increases the specific growth rate of the methanogens for a more efficient anaerobic digestion process.

47 Claims, 12 Drawing Sheets

(51) Int. Cl.
    *C02F 3/00*    (2006.01)
    *C02F 11/04*   (2006.01)
(52) U.S. Cl.
    CPC ........... *C02F 11/04* (2013.01); *C02F 2209/001*
        (2013.01); *C02F 2209/006* (2013.01); *C02F*
        *2209/24* (2013.01); *C02F 2209/245* (2013.01);
        *C02F 2305/06* (2013.01); *Y02E 50/343*
        (2013.01); *Y10S 210/903* (2013.01); *Y10S*
        *210/906* (2013.01)

(56) References Cited

U.S. PATENT DOCUMENTS

| | | | |
|---|---|---|---|
| 4,735,724 | A | 4/1988 | Chynoweth et al. |
| 4,818,407 | A | 4/1989 | Bogusch |
| 4,988,442 | A | 1/1991 | Highsmith et al. |
| 4,999,111 | A * | 3/1991 | Williamson ............. 210/605 |
| 5,019,266 | A | 5/1991 | Soeder et al. |
| 5,076,927 | A | 12/1991 | Hunter |
| H1149 | H | 3/1993 | Wyman et al. |
| 5,207,911 | A | 5/1993 | Pellegrin et al. |
| 5,264,349 | A | 11/1993 | De Baere |
| 5,338,445 | A | 8/1994 | Zumbragel et al. |
| 5,451,319 | A | 9/1995 | Kobayashi |
| 5,514,264 | A | 5/1996 | Shane |
| 5,656,059 | A | 8/1997 | Monster et al. |
| 5,723,048 | A | 3/1998 | Kobayashi et al. |
| 5,849,192 | A | 12/1998 | Jagush et al. |
| 5,863,435 | A | 1/1999 | Heijnen et al. |
| 6,159,371 | A | 12/2000 | Dufay |
| 6,241,897 | B1 | 6/2001 | Hanson et al. |
| 6,254,775 | B1 | 7/2001 | McElvaney |
| 6,372,137 | B1 | 4/2002 | Bounds |
| 6,444,124 | B1 | 9/2002 | Onyeche et al. |
| 6,569,334 | B1 | 5/2003 | Yoneda |
| 6,692,642 | B2 | 2/2004 | Josse et al. |
| 6,893,567 | B1 | 5/2005 | Vanotti et al. |
| 7,001,519 | B2 | 2/2006 | Linden et al. |
| 7,014,763 | B2 | 3/2006 | Johnson et al. |
| 7,087,170 | B2 * | 8/2006 | You et al. .............. 210/605 |
| 7,641,796 | B2 | 1/2010 | Stroot et al. |
| 7,655,143 | B2 | 2/2010 | Stroot et al. |
| 8,545,700 | B1 | 10/2013 | Stroot et al. |
| 2005/0218074 | A1 | 10/2005 | Pollock |
| 2007/0163952 | A1 | 7/2007 | Schreier et al. |
| 2008/0006587 | A1 | 1/2008 | Cumming et al. |
| 2008/0164196 | A1 | 7/2008 | Sumino et al. |
| 2009/0107913 | A1 * | 4/2009 | Johnson .............. 210/604 |

OTHER PUBLICATIONS

Wett et al., The Role of Inorganic Carbon Limitation in Biological Nitrogen Removal of Extremely Ammonia Concentrated Wastewater, Water Research, 2003, vol. 37, pp. 1100-1110.
Van Hulle et al., Influence of Temperature and pH on the Kinetics of the SHARON Nitration Process, Journal of Chemical Technology and Biotechnology, 2007, vol. 82, No. 5, pp. 471-480.
Vazquez-Padin et al., Applications of Anammox Based Processes to Treat Anaerobic Digester Supernatant at Room Temperature, Bioresource Technology, 2009, vol. 100, pp. 2988-2994.
Daims et al., In Situ Characterization of Nitrospira-Like Nitrite-Oxidizing Bacteria Active in Wastewater Treatment Plants, Applied and Environmental Microbiology, 2001, vol. 67, No. 11, pp. 5273-5284.
Green et al., The Effect of CO2 Concentration on a Nitrifying Chalk Reactor, Water Research, 2002, vol. 36, pp. 2147-2151.
De Los Reyes et al., Group-Specific Small-Subunit rRNA Hybridization Probes to Characterize Filamentous Foaming in Activated Sludge Systems, Applied and Environmental Microbiology, 1997, vol. 63, No. 3, pp. 1107-1117.
Mobarry et al., Phylogenetic Probes for Analyzing Abundance and Spatial Organization of Nitrifying Bacteria, Applied and Environmental Microbiology, 1996, vol. 62, No. 6, pp. 2156-2162.

Denecke et al., Effect of Carbon Dioxide on Nitrification Rates, Bioprocess. Biosyst. Eng., 2003, vol. 25, pp. 249-253.
Melcer et al., Methods for Wastewater Characterization in Activated Sludge Modeling, Water Environment Research Foundation, 2003, IWA Publishing.
Dagley et al., Physicochemical Aspects of Bacterial Growth. Part II. Quantitative Dependence of the Growth Rate of Bact. Lactis Aerogenes on the Carbon Dioxide Content of the Gas Atmosphere, J. Chem. Soc., 1938, pp. 1936-1942.
Jeyanayagam, True Confessions of the Biological Nutrient Removal Process, Florida Water Resources Journal, 2005, pp. 37-46.
Metcalf et al., Wastewater Engineering Treatment and Reuse, Fundamentals of Biological Treatment, 2003, McGraw-Hill, New York, pp. 611-616.
Wett, B., Eladawy, A., and Becker, W. (2003). "Carbonate addition—an effective remedy against poor activated sludge settling properties and alkalinity conditions in small wastewater treatment plants." Water Sci Technol, 48(11-12), 411-417.
Byong-Hee, J., Yasunori, T., and Hajime, U. (2000). "Stimulating Accumulation of Nitrifying Bacteria in Porous Carrier by Addition of Inorganic Carbon in a Continuous-Flow Fluidized Bed Wastewater Treatment Reactor." J. Biosci Bioeng, 89(4), 334-339.
Davoli, D., Madoni, P., Guglielmi, L., Pergetti, M., and Barilli, S. (2002). "Testing the effect of selectors in the control of bulking and foaming in full scale activated-sludge plants." Water Sci Technol, 46(1-2), 495-498.
Gordon, L., and Paskins, A. (1982). "Influence of High Partial Pressure of Carbon Dioxide and/or Oxygen on Nitrification." J. Chem Tech, 32, 213-223.
Jetten, M. S., Cirpus, I., Kartal, B., Van Niftrik, L., Van De Pas-Schoonen, K. T., Sliekers, O., Haaijer, S., Van Der Star, W., Schmid, M., Van De Vossenberg, J., Schmidt, I., Harhangi, H., Van Loosdrecht, M., Gijs Kuenen, J., Op Den Camp, H., and Strous, M. (2005). "1994-2004: 10 years of research on the anaerobic oxidation of ammonium." Biochem Soc Trans, 33(Pt 1), 119-123.
Jirka, A. M., and Carter, M. J. (1975). "Micro semi-automated analysis of surface and wastewaters for chemical oxygen demand." Anal Chem, 47(8), 1397-1402.
Kinsbursky, R. S., and Saltzman, S. (1990). "CO2-Nitrification Relationships in Closed Soil Incubation Vessels." Soil Biol Biochem, 22(4), 571-572.
Nielsen, P. H., De Muro, M. A., and Nielsen, J. L. (2000). "Studies on the in situ physiology of *Thiothrix* spp. present in activated sludge." Environ Microbiol, 2(4), 389-398.
Noutsopoulos, C., Mamais, D., and Andreadakis, A. D. (2002). "The effect of reactor configuration and operational mode on *Microthrix parvicella* bulking and foaming in nutrient removal activated sludge systems." Water Sci Technol, 46(1-2), 61-64.
Odintsova, E. V., Wood, A. P., and Kelly, D. P. (1993). "Chemolithoautotrophic growth of *Thiothrix ramosa*." Arch Microbiol, 160, 152-157.
Pitt, P., and Jenkins, D. (1990). "Causes and control of Nocardia in activated sludge." Res. J. Water Polln. Control. Fedn., 37(2), 151-162.
Sakairi, M. A., Yasuda, K., and Matsumura, M. (1996). "Nitrogen removal in seawater using nitrifying and denitrifying bacteria immobilized in porous cellulose carrier." Water Science and Technology, 34(7-8), 267-274.
Van Loosdrecht, M. C. M., Brandse, F. A., and DeVries, A. C. (1998). "Upgrading of Wastewater Treatment Processes for Integrated Nutrient Removal—The BCFS® Process." Wat Sci Tech., 37(9), 209-217.
Samuel J. DuPont, Matthew R. Cutter, and Peter G. Stroot, FISH-RiboSyn: A Rapid Approach for Determining the Specific Growth Rate of a Distinct Microbial Population in a Mixed Culture, World Environmental and Water Resources Congress 2007: Restoring Our Natural Habitat, pp. 1-9.
International Search Report for PCT/US2012/025237, filed Feb. 15, 2012, mailing date of Oct. 24, 2012.
Kuenen, Anammox bacteria: from discovery to application, Nature Reviews, 2008, vol. 6, pp. 320-326.

* cited by examiner

METHOD AND SYSTEM FOR TREATING WASTEWATER AND SLUDGES BY OPTIMIZING SCO₂ FOR ANAEROBIC AUTOTROPHIC MICROBES

CROSS REFERENCE TO RELATED APPLICATIONS

This application is a continuation of prior filed International Application, Serial Number PCT/US2012/025237 filed Feb. 15, 2012, which claims priority to U.S. Provisional Application No. 61/443,089 entitled "Method of Optimizing $CO_2$ Levels to Increase Bacteria Levels in Sludge Treatment", filed Feb. 15, 2011 and U.S. Provisional Application No. 61/487,504 entitled "Optimization of Dissolved Carbon Dioxide for Anaerobic Autotrophic Bacteria and Archaea", filed May 18, 2011, the contents of each of which are hereby incorporated by reference into this disclosure.

FIELD OF INVENTION

This invention relates to water treatment. Specifically, the invention discloses a method of optimizing $CO_2$ levels to increase the specific growth rate of Anammox bacteria for efficient nitrogen removal from wastewater and methanogens for rapid anaerobic digestion of sewage sludges and other biodegradable solids. In addition, novel configurations of wastewater treatment systems and anaerobic digester systems are provided that utilize $CO_2$ stripping equipment to provide optimal growth conditions for Anammox and methanogens with respect to soluble $CO_2$ concentrations.

BACKGROUND OF THE INVENTION

For the past century, environmental engineers have been using the activated sludge system and anaerobic digestion to successfully treat municipal wastewater (Metcalf & Eddy (2003). Wastewater Engineering: Treatment and Reuse. New York, N.Y., McGraw-Hill). In the United States, the nitrification process in the activated sludge system of public owned treatment works (POTWs) is very expensive with capital costs of the aeration basin alone valued at $26B and annual electricity costs of $335M (EPA (1996). Clean Watersheds Needs Survey (CWNS). W. D.C. Office of Water; Goldstein, R. and W. Smith (2002). Water & Sustainability (Volume 4): U.S. Electricity Consumption for Water Supply & Treatment—The Next Half Century. Palo Alto, EPRI; EPA (2007). Biological Removal Processes and Costs. W. D.C. Office of Water). More recently, the United States Environmental Protection Agency has proposed a stricter effluent nutrient limit (Total N of 0.82-1.73 mg/L and Total P of 0.069-0.415 mg/L) for Florida POTWs that is estimated to cost $24.4-50.7B in capital investment and increase annual operating expenses by $0.4-1.3B (Oskowis, J. (2009). Re: Numeric Nutrient Criteria Cost Implications for Florida POTW's G. C. Crist). Over half of the capital investment will upgrade the existing activated sludge system to an advanced biological nutrient removal (BNR) system. It is anticipated that the numerous extended aeration plants used for secondary treatment of wastewater in FL will be upgraded to Bardenpho 5-stage (BP5) systems or other advanced BNR system for biological nitrogen and phosphorus removal. The BP5 upgrade of the extended aeration plants will most likely not include the introduction of a primary clarifier and instead, the process will be operated with an elevated integrative resource recovery (IRR). The impact of the IRR on the microbial ecology of BNR systems has not been reported.

Researchers used empirical studies to identify key operating parameters for these systems to ensure effective performance. In order to increase the protection of surface waters from excessive oxygen demand from treated wastewater, engineers have modified the simple aeration basin to include anoxic and anaerobic zones and recycled nitrate-rich wastewater and anaerobic digester supernatant to promote biological nutrient removal. The anoxic zones allow for nitrogen removal by providing conditions with no dissolved oxygen and high nitrate levels for denitrification of nitrate rich wastewater. The anaerobic zones are necessary for phosphorous removal because anaerobic (no dissolved oxygen or nitrate) conditions are necessary for the phosphorous accumulating organisms (PAO) to release phosphorous and take up volatile fatty acids. These anaerobic zones are not used to generate methane.

The activated sludge system designs and operations are dependent on providing adequate biomass concentration in the aeration tank, environmental conditions for the biomass, and adequate time for the bioreaction. Carbonaceous biochemical oxygen demand (BOD) and ammonium are consumed as substrate by the heterotrophic and nitrifying bacteria, respectively. The conventional nitrification process requires a lengthy solids retention time (SRT), which prevents the washout of the slow-growing aerobic autotrophic microbes.

In addition to the aerobic, autotrophic bacteria (nitrifying bacteria), the growth of anaerobic, autotrophic bacteria (Anammox bacteria and others) and Archaea (methanogens) are also sensitive to the dissolved $CO_2$ concentration. Like the aerobic, autotrophic bacteria, the Andrew's equation describes this sensitivity of their specific growth rate to the dissolved $CO_2$ concentration. The anaerobic, autotrophic Archaea are thought to have a conserved metabolism with respect to the evolutionary time-scale, which may explain the similar Andrew's equation predictions for the optimal dissolved $CO_2$ concentration for both bacteria and Archaea. In other words, the similarities in the predictions of the Andrew's equation for the optimal dissolved $CO_2$ concentration for the specific growth rate of microbes may be the result of a common ancestor to both bacteria and archaea. This would predict that all autotrophic bacteria and archaea have similar autotrophic metabolism and dissolved $CO_2$ sensitivities. This new knowledge can be useful for the improvement of the current practice for the treatment of wastewater (i.e., Anammox for nitrogen removal), sludges (i.e., methanogenesis for anaerobic digestion), and contaminated soils (i.e., dechlorinating bacteria and methanogens for complete mineralization of chlorinated organics) where anaerobic, autotrophic microbes are recognized as the rate-limiting step. In addition, landfill operation (i.e., methanogens) and biogenic methane production of coal beds (i.e., methanogens) may also benefit by optimization of dissolved $CO_2$ concentration.

Anammox bacteria can be used in sludge treatment systems to treat anaerobic digester sludge supernatant that consists of high levels of ammonium. Typically, the SHARON reactor is used to oxidize one half of the ammonium to nitrite and the blend of ammonium and nitrite is fed to the Anammox reactor. Researchers have reported that the Anammox bacteria have a very long doubling time of 12 days. However, the operation of the Anammox reactor is at 5% $CO_2$ in the headspace and controlled temperature (35° C.). This results in an elevated dissolved $CO_2$ concentration, which inhibits the growth of these anaerobic, autotrophic bacteria. Operation at much lower and optimal dissolved $CO_2$ concentration will reduce the doubling time to a few hours, which improve the performance of these bioreactors and may offer the opportunity for utilization of the Anammox bacteria for the treatment wastewater at ambient temperatures. This approach would reduce the capital and operating costs for BNR systems.

Current operation of anaerobic digesters for the bioconversion of organic solids to biogas (i.e., methane and carbon dioxide) exposes the biomass to the biogas. This exposure to the biogas controls the dissolved carbon dioxide based on Henry's constant, temperature, and the partial pressure of carbon dioxide ($pCO_2$) in the biogas. The carbon dioxide concentration of the biogas for anaerobic digesters is typically between about 35 to about 50%. This range of gas phase carbon dioxide results in an elevated dissolved carbon dioxide concentration, which inhibits the growth of the methanogens. The methanogens are considered to be the rate-limiting step in anaerobic digesters with specific growth rate of 0.35 $d^{-1}$ used for the design of the bioreactors. Anaerobic digestion of sludge typically requires the use of large holding tanks sized to accommodate enough sludge to account for a 20-day hydraulic retention time, which is required to maintain adequate biomass of slowly growing methanogens.

With proper control of the gas phase carbon dioxide level in the biogas exposed to the biomass, the specific growth rate of the methanogens can be increased substantially. For example, operation at 5% $CO_2$ in the headspace for the direct production of biomethane (95-98% $CH_4$; 2-5% $CO_2$) increases the specific growth to about 2.36-2.92 $d^{-1}$ compared to about 0.30-0.38 $d^{-1}$ for conventional systems. The faster specific growth rate of the methanogens will allow for the design and operation of smaller anaerobic digesters for equivalent organic loading rates. With a safety factor of 5, conventional anaerobic digesters are operated at a minimum solids retention time (SRT) of 15 days, which corresponds to 0.31 $d^{-1}$ for methanogens. With this invention and same safety factor, the minimum solids retention time for an anaerobic digester generating biomethane is about 1.71-2.12 days. This translates into a reactor that is between about 11-14% of the size of the conventional anaerobic digester used for the treatment of municipal sewage sludges. Operation at headspace $CO_2$ concentrations lower than 5% will further increase the specific growth rate of the methanogens, but it may not be economically feasible due to the capital costs of the $CO_2$ stripper and solids pretreatment technologies required for improved biodegradability of sewage solids. For operation at lower SRT, pretreatment of feed sludges or other organic solids that have low hydrolysis rates may be necessary. For example, the minimum hydrolysis rates for primary and waste activated sludge are 0.4 and 0.15 $d^{-1}$, respectively. It is unclear whether the rapid rate of methanogenesis from the optimization of the soluble $CO_2$ concentration may improve the rates of hydrolysis and subsequent fermentation by reducing the concentration of soluble and gaseous intermediates. A number of physical process technologies are available that treat the sewage sludges at high temperatures and/or pressures in order to generate soluble organics.

Alternatively, an existing anaerobic digester operating at an SRT of 15 days could be fed much higher organic loading rates than is recommended without inhibition of performance. This higher organic loading rate could be accomplished by either thickening the sewage sludges or adding other types of organic solids, such as food or paper wastes. These organic solids, especially the paper wastes, may require pretreatment to improve their biodegradability.

A biological approach improves the degradability of the sewage sludges prior to methanogenesis by the use of a thermophilic (55° C.) anaerobic reactor (acidogenic bioreactor) with a low SRT (2-3 days) for the express purpose of generating high levels of volatile fatty acids from the hydrolysis and fermentation of the sewage sludges. The Glendale wastewater treatment plant at Lakeland, Fla. utilizes this approach (2.1 days SRT in the thermophilic, acidogenic bioreactor) and generates low rates of biogas (37% $CH_4$). Despite the low SRT, the thermophilic methanogens are still present and active in the system. The elevated $CO_2$ concentration prevents the thermophilic methanogens from growing at faster rates. Operation at a lower headspace $CO_2$ concentration will increase the specific growth rate of the thermophilic methanogens, which may eliminate the need for the downstream mesophilic anaerobic digester (methanogenic bioreactor).

Optimizing the specific growth rate of the Anammox bacteria and methanogens by controlling the soluble $CO_2$ concentration also has great implications in the biological treatment of wastewater and sludges. For biological nitrogen removal, the control of soluble $CO_2$ concentration is a new tool for designers of wastewater treatment systems that promise lower capital and operating costs. Rapid growth by Anammox bacteria by control of soluble $CO_2$ concentration makes efficient nitrogen removal from wastewater at ambient conditions a possibility. The inventor has also discovered that the gas phase $CO_2$ concentration can be optimized such that the rate of biogas formation is improved in the anaerobic digestion of sewage sludges. Increasing the specific growth rate of the methanogens by control of the soluble $CO_2$ concentration by stripping $CO_2$ from the collected biogas decreases the required solids retention time and in turn smaller digesters can be used which will save on capital costs. Heating the contents of the anaerobic digesters may not be necessary, if higher specific growth rates of methanogens are exhibited due to control of the soluble $CO_2$ concentration, which will lower operating costs and make more biomethane available for other uses.

SUMMARY OF INVENTION

The growth sensitivity of anaerobic autotrophic microbes to dissolved $CO_2$ has not previously been studied. The present invention describes a method of optimizing the soluble carbon dioxide ($sCO_2$) concentration in a wastewater treatment system, which increases the specific growth rate of Anammox bacteria and methanogens.

The rapidly growing Anammox bacteria can be used as an alternative to the nitrifying step currently being used in wastewater treatment facilities. A method and system of treating wastewater in which an Anammox reactor is added to the system and the $sCO_2$ concentration is optimized is presented.

Laboratory-scale anaerobic digesters demonstrated the impact of lowering the gas phase concentration of carbon dioxide on the biogas formation rate. In addition, this data was used to estimate the parameters of the Andrew's equation for the methanogens, which revealed an optimal carbon dioxide concentration in the biogas of about 0.5 to about 5% for rapid growth. Operation of anaerobic digesters at optimal gas phase carbon dioxide concentration will improve the rate of biogas formation. It was also found that all autotrophic anaerobic bacteria and archaea appear to have similar optimal dissolved $CO_2$ concentrations that are between about 0.5% to about 1.0% $CO_2(g)$. High temperature (i.e., thermophilic) anaerobic digestion at low SRT may be attractive, since the rates of hydrolysis of sewage sludges are much faster than mesophilic operation and may yield an acceptable endproduct (biosolids) with excellent volatile solids destruction. Alternatively, low temperature anaerobic digestion may also be possible, since the specific growth rate of methanogens is sensitive to temperature. The combination of optimal gas phase carbon dioxide concentration and lower temperature would offer an opportunity for lower capital and operating costs. This discovery goes beyond municipal wastewater sludge treatment and will also benefit the agriculture industry, which has substantial crop and animal waste that could benefit from an anaerobic digester with lower capital costs.

This new process requires a much smaller tank and does not sacrifice performance as compared to standard anaerobic digestion processes. Resulting equipment costs and capital costs are reduced considerably. Land requirements are similarly reduced.

Also presented is a method and system for sludge treatment in which the $CO_2$ stripper is repositioned to recycle biogas from the headspace and lower the $CO_2$ levels before returning it to the headspace or using it directly for gas mixing of the bioreactor contents. The repositioning of the $CO_2$ stripper allows for controlling the soluble $CO_2$ levels to the optimum $CO_2$ concentration which increases the specific growth rate of the methanogens. This increase results in a reduction in capital costs for wastewater treatment facilities.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
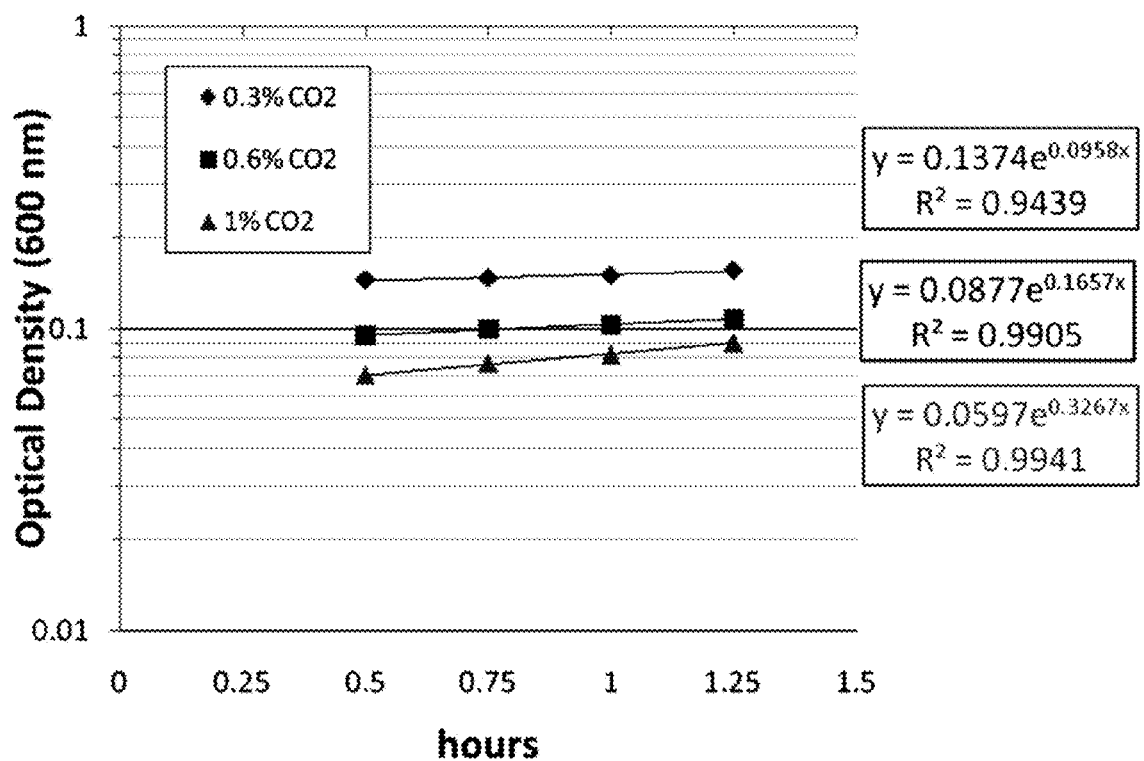
FIG. 1 is a graph showing the specific growth rate of Anammox bacteria for low % $CO_2$ and 24° C.

In the following detailed description of the preferred embodiments, reference is made to the accompanying drawings, which form a part hereof, and within which are shown by way of illustration specific embodiments by which the invention may be practiced. It is to be understood that other embodiments by which the invention may be practiced. It is to be understood that other embodiments may be utilized and structural changes may be made without departing from the scope of the invention.

All numerical designations, such as pH, temperature, time, concentration, and molecular weight, including ranges, are approximations which are varied up or down by increments of 1.0 or 0.1, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

The anaerobic autotrophic microorganisms are found in the Bacteria and Archaea branches of the Tree of Life. Several types of anaerobic autotrophic microbes including the Anammox bacteria, sulfate reducing bacteria (SRB), acetogens, dehalogenating bacteria, and methanogens have value for environmental remediation, but have limited application due to their slow specific growth rate or doubling time that is often reported on the order of days.

Anammox Bacteria

The Anammox bacteria are autotrophic, which means they use dissolved $CO_2$ as their carbon source for growth. Previous research has revealed that the dissolved $CO_2$ concentration can be optimized for another autotrophic bacteria, the nitrifying bacteria, used in the biological treatment of ammonium-rich wastewater. In addition, full-scale wastewater treatment plants operate at elevated dissolved $CO_2$ concentrations, which reduce the specific growth rate of the nitrifying bacteria. The impact of elevated dissolved $CO_2$ concentrations on the growth of the Anammox bacteria has not previously been researched.

Rapid growth of Anammox bacteria was discovered by using the FISH method to identify, enumerate, and evaluate the specific growth rate. Briefly, the FISH method was conducted with a probe designed to detect Anammox bacteria and it was determined that high levels (>50%) of Anammox were present in the bioreactor. The whole cell fluorescence was very high compared to the cells in the seed material (~1% abundance), which indicated high ribosome content in the Anammox bacteria cells of the experimental bioreactor. This high ribosome content is associated with a high specific growth rate.

The specific growth rate or doubling time of the Anammox bacteria was determined to be sensitive to the dissolved $CO_2$ concentration. Optimizing the dissolved $CO_2$ concentration increases the specific growth rate (or reduces the doubling time) of the Anammox bacteria. With faster rates of growth, an alternative for biological ammonium removal may be possible at full-scale wastewater treatment plants that provide optimal dissolved $CO_2$ concentrations for the growth of the Anammox bacteria. The faster rates of growth may also be used to provide an alternative sludge treatment system in which a $CO_2$ stripping process is used where biogas from the headspace of an anaerobic digester is flowed through a $CO_2$ stripper and optimized. The optimized $CO_2$ is then recycled back into the digester headspace. This results in the use of reactors having a smaller reactor size thus reducing capital and energy costs.

Previous Research

As disclosed in U.S. Pat. Nos. 7,655,143 and 7,641,796 as well as U.S. patent application Ser. No. 12/711,525, each of which is herein incorporated by reference into this disclosure, the inventor has previously developed a method of stimulating nitrification at low SRT by elevating the partial pressure of $CO_2$ ($pCO_2$) during aeration (U.S. Pat. No. 7,655,143); an anaerobic digestion process for low-solid waste (U.S. Pat. No. 7,641,796); and a method for the reduction and control of pH and soluble $CO_2$ for optimal nitrification for domestic, industrial and municipal wastewater (U.S. patent application Ser. No. 12/711,525).

As disclosed in U.S. Pat. No. 7,641,796, the inventors previously found that thickening the solids content in blended sludge from 1-4% to 10-20% allows for a large reduction in reactor volume. This smaller reactor can control the dissolved $CO_2$ concentration by controlling the $pCO_2$ concentration in the reactor.

As disclosed in U.S. Pat. No. 7,655,143, elevating $pCO_2$ increases the concentration of carbon dioxide and lowers the pH which improves nitrification thus the specific growth rate of nitrifying bacteria is sensitive to $pCO_2$, pH and dissolved oxygen (DO). The dissolved oxygen is a function of the aeration rate.

As disclosed in U.S. patent application Ser. No. 12/711,525, the inventors previously determined that optimizing the soluble $CO_2$ concentration in the aeration basin of an activated sludge system significantly improves the specific growth rate of the nitrifying bacteria resulting in a reduction of capital and energy costs for municipalities.

The method described herein is based on the disclosure in U.S. patent application Ser. No. 12/711,525 and U.S. Pat. No. 7,655,143 relating to the optimal dissolved $CO_2$ for nitrifying bacteria. The inventors have previously used a special chamber to control the dissolved $CO_2$ concentration via control of the $pCO_2$ concentration in the chamber (described in U.S. Pat. No. 7,641,796). The chamber was anaerobic by using anaerobic $N_2$ gas to continuously flush the chamber. An oxygen trap was used to remove any oxygen from an $N_2$ cylinder and ensured anaerobic conditions in the chamber. Seed material from a local wastewater treatment plant was severely diluted into synthetic wastewater with 100 mg N/L of ammonium and nitrite. A phosphate buffer was used to control the pH to near neutral (about 7 to about 7.5).

In the present invention, the anaerobic autotrophic bacteria and archaea were found to have growth that is also sensitive to soluble carbon dioxide ($CO_2$) that obeys the Andrew's equation and not the normal Monod equation. In most cases, natural and engineered systems have been operating with an elevated soluble $CO_2$ concentration that severely inhibits the growth of the anaerobic autotrophic microbes. Operation of engineered systems (i.e., wastewater treatment plants) at optimal soluble $CO_2$ concentration will reduce the capital costs of existing systems and may lead to new designs for improved performance (i.e., utilization of Anammox bacteria for treatment of wastewater as an alternative to nitrifying bacteria).

Beyond wastewater treatment plants, landfills may benefit from the operation of lower gas phase $CO_2$ with the goal of optimizing the soluble $CO_2$ for higher rates of methanogenesis. Beyond engineered systems, the optimization of soluble $CO_2$ may also improve the rates of dehalogenation of organic pollutants in soils and sediments. More recently, there has been interest in ex situ and in situ conversion of fossil fuels (i.e., coal and oil) to natural gas by the introduction of water and nutrients. The optimization of soluble $CO_2$ may also increase the rate of methanogenesis in these types of systems.

Andrew's Equation

Andrew's equation describes the relationship between specific growth rate of anaerobic autotrophs and dissolved carbon dioxide. Three parameters are used to define Andrew's equation for anaerobic autotrophs: $\mu_{max}$, $K_{s,CO2}$, and $K_{i,CO2}$, where $\mu_{max}$ is the maximum specific growth rate, $h^{-1}$; $K_{s,CO2}$ is the saturation constant for $CO_2$, mg/L; and $K_{i,CO2}$ is the inhibition constant for $CO_2$, mg/L. [CO2] is the concentration of $CO_2$. The specific growth rate ($\mu_{obs}$) is reduced by the decay coefficient (b or $k_d$). The parameters $\mu_{max}$, $K_s$, $K_i$, and b are estimated to best fit the observed specific growth rates.

$$\mu obs = \mu max \times \frac{[CO2]}{[CO2] + Ks, CO2 + \frac{[CO2]^2}{Ki, CO2}} - b \quad (eq\ 1)$$

For anaerobic autotrophs, the dissolved $CO_2$ or soluble $CO_2$ ($sCO_2$) is not optimal with respect to specific growth rate, which limits biotechnology applications utilizing these microbes. Two examples of $sCO_2$ inhibition of anaerobic autotrophic microbes are provided.

Example 1

Optimizing $CO_2$ Concentrations and Using Optimized $CO_2$ Concentrations in Wastewater Treatment Systems Anammox bacteria are thought to have a fastest doubling time of 12 days, but these bioreactors are operated with 5% $CO_2$ in the headspace. This elevated level of gas phase $CO_2$ dictates the dissolved $CO_2$ in these reactors, which inhibits the specific growth rate of these bacteria.

A lab-scale bioreactor was operated in a special chamber with anaerobic conditions (oxygen-free $N_2$ gas provided continuously at 100 ml/min and additions of sodium sulfide, a reducing agent) and about 0.6% $CO_2$ in the gas phase (Coy $CO_2$ controller). The lab-scale bioreactor was provided non-limiting ammonium and nitrite (100 mg/L as N) and phosphate buffer to ensure a neutral pH (about 7.6 to about 8). The bioreactor was mixed by use of a magnetic stir bar and stir plate. This bioreactor was used to enrich activated sludge with an estimated initial 0.5% Anammox bacteria to >95% Anammox bacteria in a few weeks. This enrichment was used as the inoculum in a batch test for measuring the optical density of in side-arm flasks with approximately 19 mL of synthetic media and a small inoculum of this enrichment (1 mL), which maximized the head space available (345 mL) for $N_2$ and about 0.6 to about 1% $CO_2$. The synthetic media was equilibrated to the gas phase $CO_2$ by placing the side-arm flask inside of the anaerobic chamber with constant % $CO_2$. An aquarium pump inside of the chamber was used to ensure proper flushing of the side-arm flask for 15 minutes before sealing the top with a butyl rubber stopper. Next, the reducing agent (0.05 mL of sodium sulfide) and enrichment (1 mL) was added to the side-arm flask and mixed. Optical density (600 nm) of each side-arm flask was measured by use of a Spectronic bench-top unit. In this manner, an estimate of the specific growth rate of the Anammox bacteria was possible for static incubation at room temperature (24° C.), which is lower than the operating temperature of conventional Anammox bioreactors (35° C.). This lower incubation temperature will reduce the observed specific growth rate compared to the observed maximum specific growth rate (i.e., optimal temperature and sCO$_2$ concentration). However, the provision of the optimal (or near optimal) CO$_2$ concentration may offset the reduction of the specific growth rate due to lower temperature. The CO$_2$ concentration and the temperature factors are multiplied together to adjust the maximum specific growth rate. Currently, practitioners improve the specific growth rate of the microbes by optimizing the temperature in the reactor (which costs money) for anaerobic autotrophs or increasing the dissolved oxygen in the basin (which costs money) for the aerobic autotrophs like the nitrifying bacteria. Alternatively, the present invention improves the specific growth rate by only optimizing the dissolved CO$_2$ concentration. Conventional Anammox bioreactors that operate at elevated temperature may also benefit from operation at optimal sCO$_2$ concentration, which will result in maximizing the specific growth rates of the Anammox bacteria when substrates and nutrients are not limiting.

In this experiment, the maximum specific growth rate of about 0.3267 hr$^{-1}$ or approximate 2 hour doubling time (FIG. 1) was measured at a gas phase CO$_2$ concentration of about 1%. Rapid growth was also observed at lower % CO$_2$ concentrations. Static OD measurements were observed within a few hours and were probably due to sCO$_2$ limitations.

The method used to determine the specific growth rates in FIG. 1 are based on classical method used by microbiologists: First the cell density or optical density is measured over time and these values are plotted on a semi-log graph paper. If a line is present on the semi-log graph paper, then the microbes are growing exponentially and the cell doubling time can be determined graphically or through simple mathematics. The predominant microbe present in the sample was the Anammox bacteria and growth conditions for Anammox were provided (i.e., anaerobic, CO$_2$, ammonium and nitrite). The observed specific growth rate was for the temperature of the reactors: room temperature of about 24° C. These values may be adjusted for temperature, but it is not necessary. For Anammox, practitioners provide higher temperatures (about 35° C.) like they do for the methanogens in anaerobic digesters in order improve the specific growth rate. The estimated specific growth rate shown here at lower temp and lower CO$_2$ concentrations are much higher than normal practice, thus higher temperatures may not be necessary for Anammox. An exponential curve fit was used for the observed data and the specific growth rate was provided directly into the equation. The high R$^2$ values confirm what is obvious from looking at the plots: the microbes are in exponential growth phase.

These experimental results suggest that the Anammox bacteria can grow much faster than reported in the literature. Furthermore, these results also suggest that the Anammox bacteria can grow rapidly at suboptimal temperatures, which means that wastewater treatment plants may be designed and operated in a manner that promotes the growth of these bacteria.

Optimization of sCO$_2$ in Use in Wastewater Treatment Systems

Configuration 1

Figure 2:
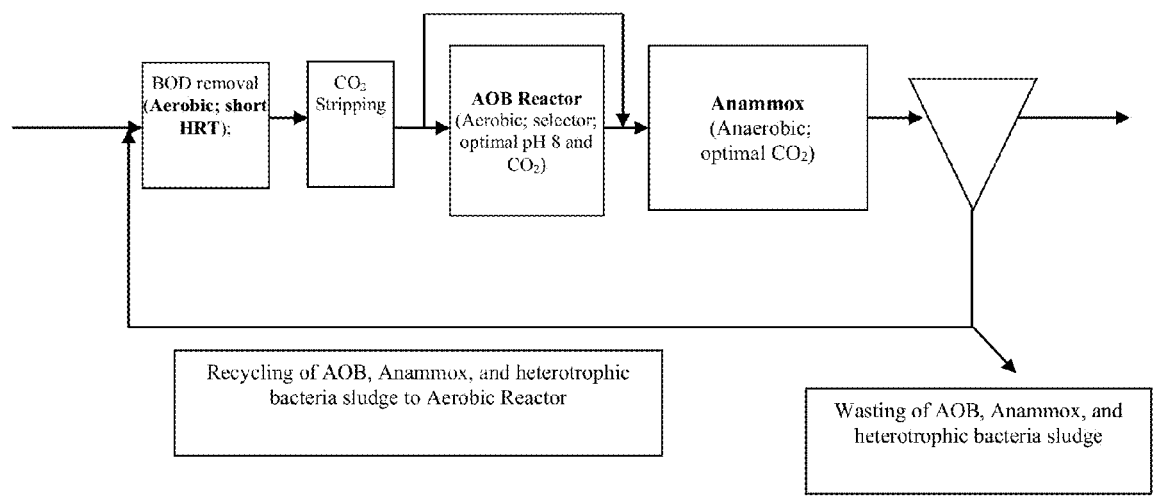
FIG. 2 is a diagram showing new wastewater treatment plant configuration utilizing Anammox bacteria that grow rapidly with optimal $sCO_2$.

In the simplest design, sCO$_2$ is optimized by stripping CO$_2$ from wastewater after aerobic treatment for BOD removal in a first aeration tank (FIG. 2). The low BOD wastewater with optimal sCO$_2$ would then be split with one half aerobically treated for nitrite formation at high pH in the AOB reactor. Caustic addition in the AOB reactor would increase the pH necessary for rapid ammonium oxidation by the ammonium oxidizing bacteria (AOB) to convert the ammonium to nitrite. The nitrite-rich wastewater from the AOB reactor can be combined with the ammonium-rich wastewater from the first aeration tank and treated in the Anammox reactor, which would not be aerated (i.e., anaerobic and optimal sCO$_2$). In the Anammox reactor, a blend of equal parts ammonium and nitrite is converted under anoxic conditions to nitrogen gas. In this configuration, BOD and nitrogen removal would be accomplished without the use of an internal recycle, which would reduce capital costs of necessary basins compared to the Modified Ludzack-Ettinger process. However, additional capital costs for CO$_2$ stripping would be necessary and chemical costs (caustic) for pH adjustment for the AOB reactor.

In this configuration, all of the active biomass passes through an aerobic zone, which may kill most or all of the strict anaerobic bacteria that are necessary for providing anaerobic conditions for the Anammox bacteria. The inventor has observed the presence of low levels of Anammox bacteria in BardenPho 5-stage systems in Florida that treat raw wastewater. However, Anammox bacteria are not present in MLE systems that treat primary effluent or raw wastewater. The design engineers use the primary solids in the BardenPho 5-stage systems in Florida (and elsewhere) for the generation of volatile fatty acids (VFA) for use by the phosphorus accumulating organisms. It appears to not be common knowledge that the lack of primary solids entering into the BardenPho 5-stage system may lead to difficulty in achieving strict anaerobic conditions in the initial, anaerobic zone. In other words, the traditional configuration of the BardenPho 5-stage system (and other systems designed for P-removal that employ an initial anaerobic zone) has difficulties in achieving true anaerobic conditions without primary solids due to the lack of strict anaerobic bacteria in these systems. The most likely cause of this absence of strict anaerobic bacteria is the exposure of all biomass to oxygen in the aerobic zone, which kills strict anaerobic bacteria. The use of primary solids in the BardenPho 5-stage system provides bioaugmentation of the system with strict anaerobic bacteria, which can provide reduced conditions for fermentation (i.e., VFA production), PAO uptake of VFA, and Anammox reaction. The low levels of Anammox bacteria in these systems are most likely due to low levels of nitrite available in the anaerobic zone.

If anaerobic conditions are difficult to maintain in the Anammox reactor due to the destruction of strict anaerobic bacteria, then two operating strategies may be employed. First, an anaerobic internal recycle (25-100%×Q$_{influent}$) of the Anammox reactor effluent to the influent of the Anammox reactor. Second, a small flow rate (1%) of primary solids or raw wastewater may be periodically or continuously provided to the Anammox reactor to ensure strict anaerobic conditions.

The initial seeding of wastewater treatment systems for Anammox should use activated sludge collected from a BardenPho 5-stage system that treats primary solids. FISH can be used to screen the seed material to ensure that Anammox bacteria are present.

Examples of CO$_2$ stripping devices include, but are not limited to, air stripping towers and trickling filters. A typical air stripping tower is a column equipped with a blower at the bottom of the column. The air stripping tower is vented to allow air and contaminants to vent to the outside. The blower blows air upward and the air removes the contaminants, here CO$_2$, from the water column. The upward air flow carries the CO$_2$ out of the venting system. The air stripping tower can be filled with packing media as in a packed column. Therefore, the air stripping tower removes contaminants from water by cascading the water over a packing material designed to uniformly disperse the water throughout the tower while providing an upward flow of air which is also designed to uniformly disperse the water throughout the tower as well as provide a supply of air into which the contaminants may dissipate.

The conventional trickling filter utilizes a film of biomass fixed on a media to remove and aerobically convert organic matter to carbon dioxide, water and additional biomass and to oxidize ammonia to nitrates. The fixed media generally consists of rock, plastic or wood. Wastewater is distributed over the biomass fixed to media through an overhead rotary distributor having generally two to four nozzled arms or spreaders. This insures a relatively even distribution of wastewater over the fixed biomass and thereby produces a relatively constant loading throughout the filter area.

These technologies have been developed by the chemical and wastewater treatment industries. Traditionally, the air stripping tower has been utilized for high mass transfer rates of volatile organic compounds, while the trickling filter has been used as a fixed-film biological process for polishing secondary effluent. However, these technologies have not been employed for removal of soluble $CO_2$ for the express purpose of increasing the specific growth rate of Anammox bacteria.

In some wastewater treatment systems, maintaining the optimal soluble $CO_2$ in the Anammox reactor may be difficult due to $CO_2$ generation from the anaerobic biodegradation of residual BOD or decay of biomass. Instead of a $CO_2$ stripper that strips soluble $CO_2$ from the liquid stream prior to treatment in the Anammox reactor; the Anammox reactor is covered with a gas impermeable membrane or fixed cover. The $CO_2$ collected in the headspace can be stripped and the gas with very low % $CO_2$ recycled to the headspace. Instead of mechanically mixing the biomass and wastewater in the Anammox reactor, the headspace gas or the recycle gas (low % $CO_2$) can be used for gas mixing. Excess gas in the headspace can be removed by a pressure relief valve. Since heterotrophic bacteria, AOB, and Anammox bacteria are growing rapidly, the solids residence time (SRT) of the system does not need to be maintained at high values typical of systems designed for nitrogen removal. To ensure proper settling of the activated sludge in the secondary clarifier, the SRT should be maintained at a value of about 5 days, which is comparable to a typical activated sludge system designed for BOD removal. Operation at this lower SRT will also ensure that nitrite oxidizing bacteria are at very low concentrations due to the washout pressure.

Configuration 2

Figure 3:
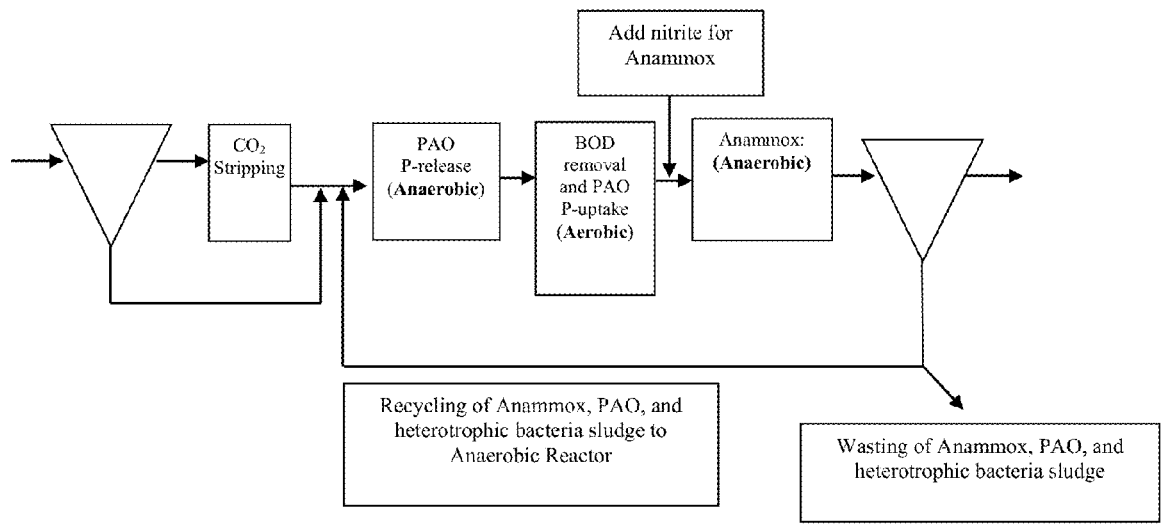
FIG. 3 is a diagram showing a new wastewater treatment plant configuration utilizing Anammox bacteria that grow rapidly with optimal $sCO_2$ and providing phosphorus removal. In this configuration, the $CO_2$ is stripped from the primary effluent and combined with the primary sludge and return activated sludge (RAS) and treated anaerobically for phosphorus release and volatile fatty acid uptake and storage as polyhydroxybutryate (PHB) or other organic storage polymer by the phosphorus accumulating organisms (PAO).

In some cases, nitrite addition may be an attractive alternative to the use of an AOB reactor (FIG. 3). In this configuration, the $CO_2$ is stripped from the primary effluent and combined with the primary sludge and return activated sludge (RAS) and treated anaerobically for phosphorus release and volatile fatty acid uptake and storage as polyhydroxybutryate (PHB) or other organic storage polymer by the phosphorus accumulating organisms (PAO). Next, the BOD is removed aerobically and the PAO take up the phosphorus by aerobically metabolizing the PHB or other organic storage polymer. At this point, excess ammonium remains in the wastewater and nitrite is added prior to the anaerobic reactor for Anammox. Careful measurement of the ammonium concentration in the wastewater entering the Anammox reactor will ensure that the proper amount of nitrite is provided. If nitrite is cost-prohibitive, then pH adjustment and an AOB reactor upstream of the Anammox reactor may be utilized. Similar to the N-removal system (FIG. 2), the SRT of this system should be maintained at a value of about 5 days to reduce the level of the nitrifying bacteria. If anaerobic conditions are difficult to maintain in the Anammox reactor, then the two strategies described for Configuration 1 may be employed.

Configuration 3

Figure 4:
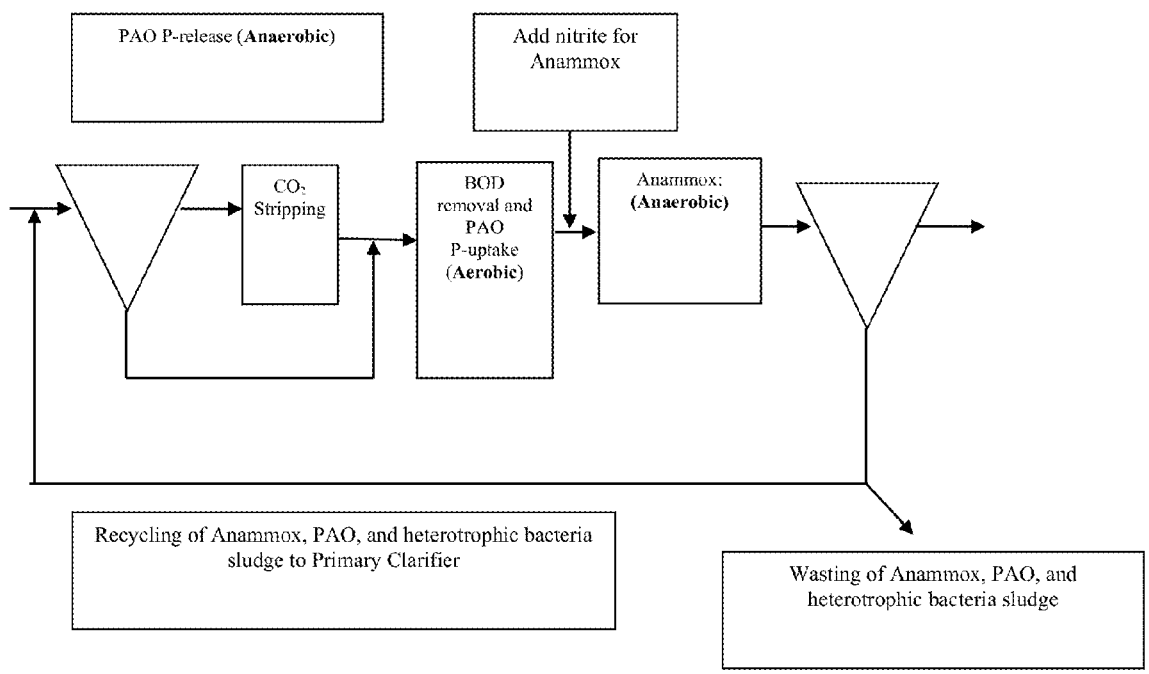
FIG. 4 is a diagram showing an alternative new wastewater treatment plant configuration utilizing Anammox bacteria that grow rapidly with optimal $sCO_2$ and providing phosphorus removal through use of the primary clarifier/$CO_2$ stripping unit process for the phosphorous accumulating organism phosphorous release (PAO P-release).

Another version (FIG. 4) uses the primary clarifier/$CO_2$ stripping unit process for the PAO P-release. This primary clarifier doesn't provide optimal solids separation. Instead, the clarified liquid runs through the air stripper to adjust the dissolved $CO_2$, if needed. However, sufficient hydraulic residence time (HRT) in the primary clarifier, usually between about 30 to about 90 minutes, is required to ensure P-release. In some cases, the addition of an anaerobic basin may be needed for treatment of the primary sludge prior to aerobic treatment. The rest of the treatment system is similar to FIG. 3. If anaerobic conditions are difficult to maintain in the Anammox reactor, then the two strategies described in Configuration 1 may be employed.

Example 2

Optimizing $CO_2$ Concentrations and Using Optimized $CO_2$ Concentrations in Sludge Treatment Systems $CO_2$-reducing methanogens have been identified as the rate-limiting step in anaerobic digesters. Due to their slow specific growth rate (textbooks use a specific growth rate of about 0.35 $d^{-1}$), anaerobic digesters are operated with a high safety factor of 5. The combination of slow specific growth and the safety factor was used for a recommended 15 day solids retention time for anaerobic digesters. However, anaerobic digesters are operated vessels with a confined head space, where the biogas is often used for mixing the contents. Typical biogas composition is about 50-60% methane, about 40-50% $CO_2$, and low levels of $H_2O$, $N_2$, $H_2S$, and $H_2$. The extremely high concentration of $CO_2$ in the headspace inhibits the specific growth rate of the methanogens and anaerobic autotrophic bacteria, such as the sulfate reducing bacteria (SRB) and acetogens.

Lab-scale anaerobic digesters were used to demonstrate the inhibition effect of elevated $CO_2$ in the gas phase on the specific growth rate of the methanogens. Anaerobic digester and sewage sludges were collected from the Glendale wastewater treatment plant at Lakeland, Fla. Sewage sludges were refrigerated prior to experimentation. The solids content of each sludge was provided. Anaerobic digester sludge (257 mL) was equilibrated in a 500 mL Pyrex bottle with a total volume of 600 mL. A butyl rubber stopper with an inlet and outlet port and low pressure gauge (1-30 psi) was secured to each bottle with a modified cap. Oxygen free gas ($CO_2$, $N_2$, or mixture of 20% $CO_2$:80% $N_2$) was delivered at 300 mL/min for 10 minutes to ensure oxygen removal and initial % $CO_2$. For low % $CO_2$, two flushes and incubation for at least 30 minutes in the shaker was necessary to equilibrate the soluble $CO_2$ and gas phase $CO_2$. In other words, operation at low % $CO_2$ caused soluble $CO_2$ to transfer to the gas phase in order to reach equilibrium according to Henry's constant. After equilibration of soluble and gas phase $CO_2$, each reactor was fed 43 mL of a mixture of sewage sludges (216 mL of primary sludge and 50 mL of waste activated sludge). This organic loading rate (~3 g VS feed/L bioreactor-day) and F:M (0.25) were selected to avoid organic overload and subsequent inhibition of methanogenesis for mixed conditions.

Figure 5:
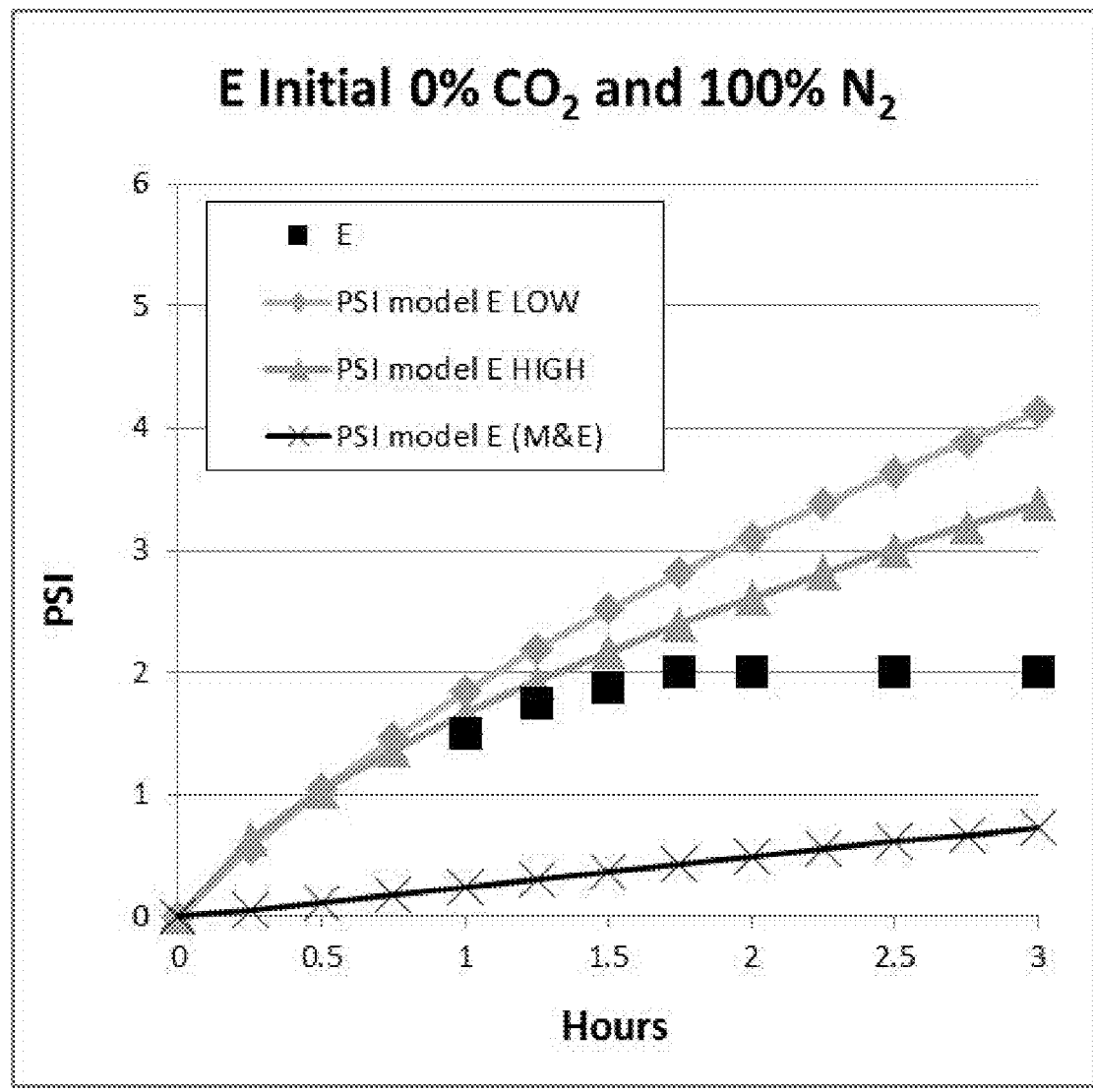
FIG. 5 is a graph showing a comparison of model predictions and experimental data for anaerobic digester with initial headspace concentrations of 0% $CO_2$ and 100% $N_2$.
Figure 6:
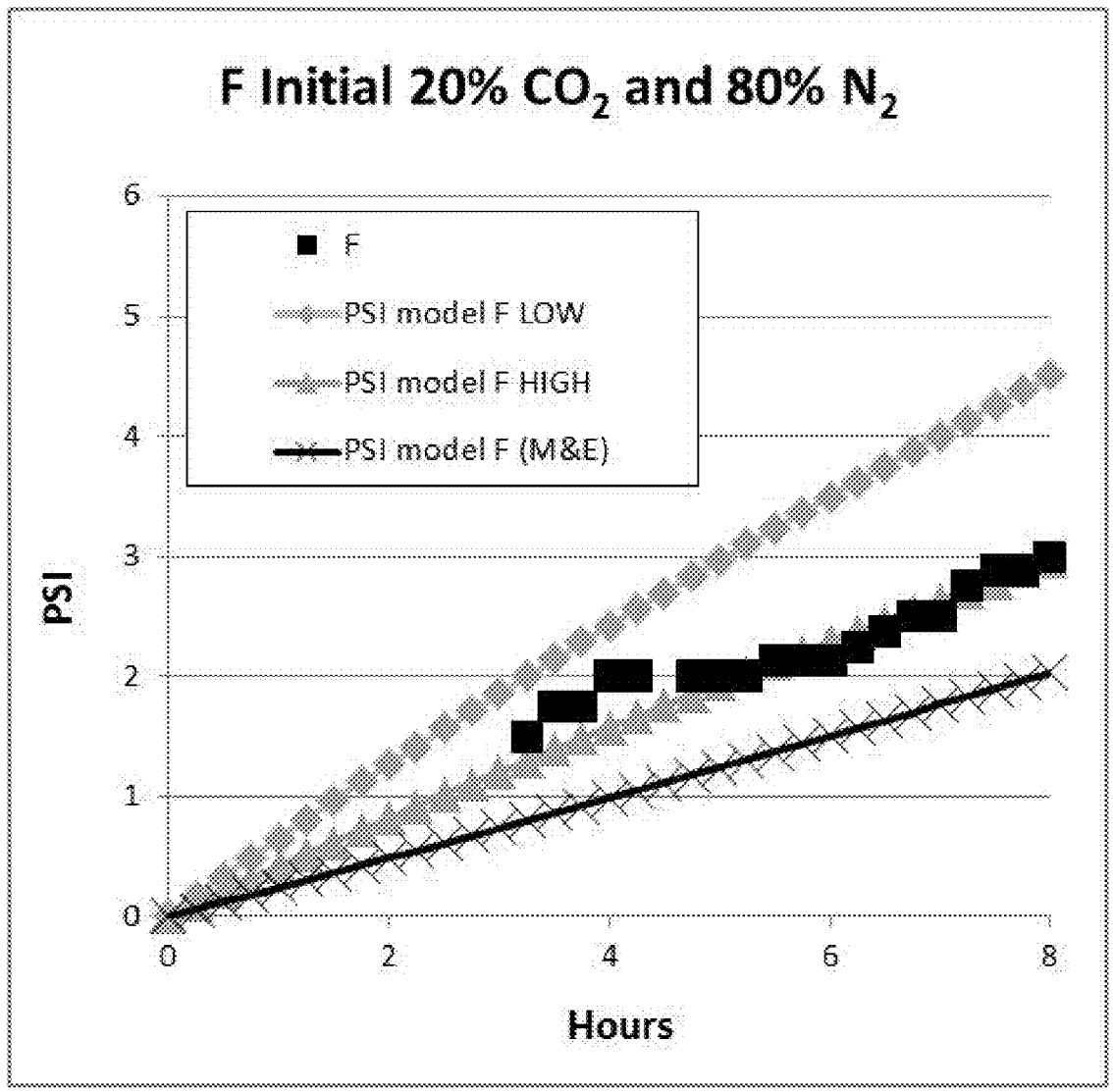
FIG. 6 is a graph showing a comparison of model predictions and experimental data for anaerobic digester with initial headspace concentrations of 20% $CO_2$ and 80% $N_2$.
Figure 7:
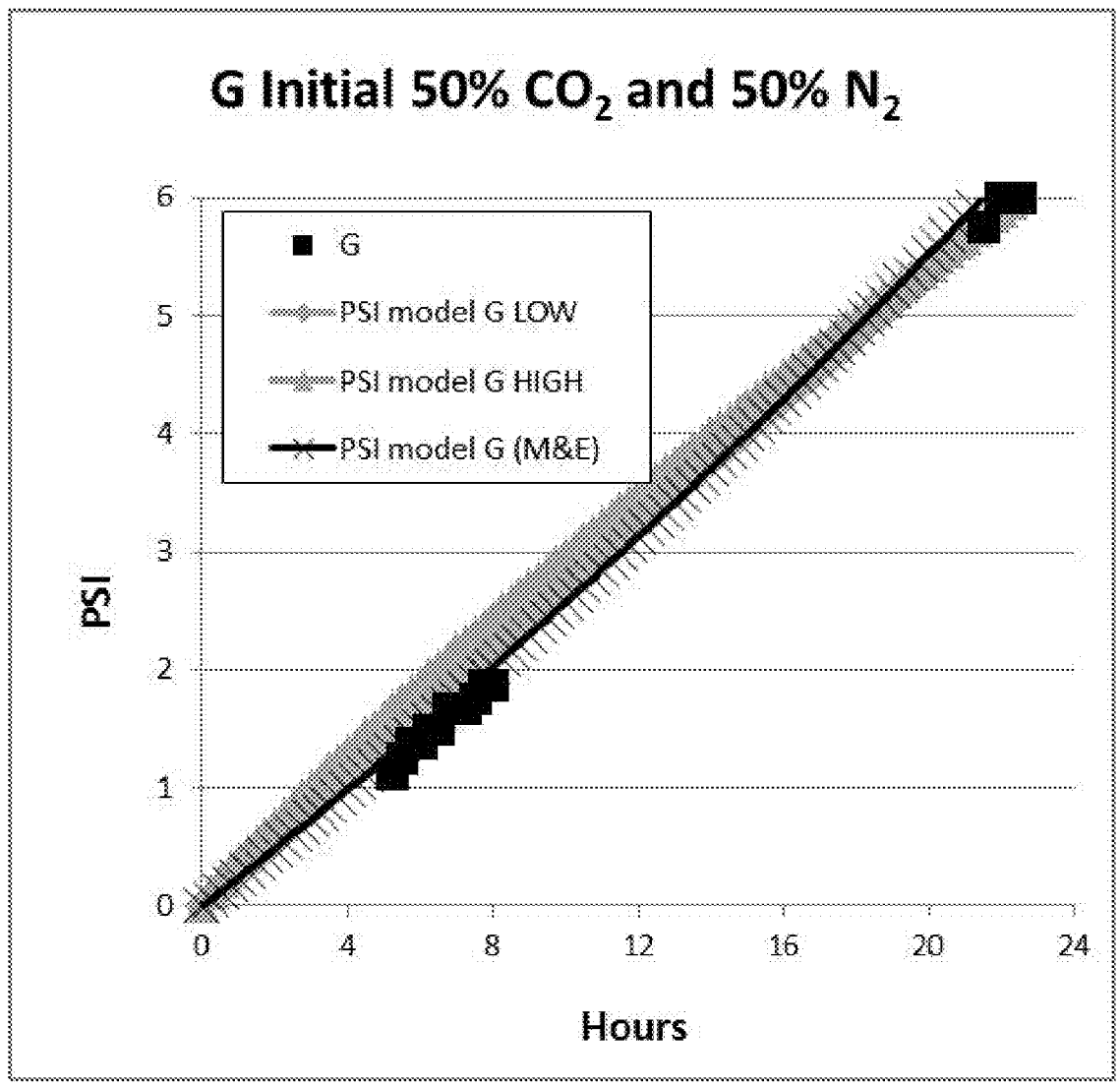
FIG. 7 is a graph showing a comparison of model predictions and experimental data for anaerobic digester with initial headspace concentrations of 50% $CO_2$ and 50% $N_2$.

The headspace was flushed as described and each anaerobic digester was incubated at 35° C. and shaken at 150 rpm. Pressure measurements for each reactor were recorded over time (FIGS. 5-7). Gas leakage was observed in the low $CO_2$ reactors. Parameters were estimated for the Andrew's equation for $CO_2$-reducing methanogens and combined with an estimated initial biomass level of $CO_2$-reducing methanogens (9% of VS) and assumed 50% $CH_4$ and $CO_2$ of biogas generated. Stoichiometry was used to link biogas generated to biomass yield (10 mL biogas/mg methanogen biomass). The high estimated parameters for the Andrew's equation were $\mu_{max}$=130 d$^{-1}$, $K_{s,CO2}$=20 mg/L $CO_2$, and $K_{i,CO2}$=0.60 (mg/L $CO_2$)$^2$. The low estimated parameters for the Andrew's equation were $\mu_{max}$=12 d$^{-1}$, $K_{s,CO2}$=20 mg/L $CO_2$, and $K_{i,CO2}$=11.0 (mg/L $CO_2$)$^2$. These parameters provide a range for the specific growth rate of the methanogens as a function of headspace % $CO_2$ and both sets of parameters are in good agreement with the experimental data. Monod kinetics parameters from Metcalf & Eddy were used to model the conventional biogas generation ($\mu$=0.35 d$^{-1}$). All models used a decay coefficient ($k_d$) of 0.02 d$^{-1}$.

Figure 8:
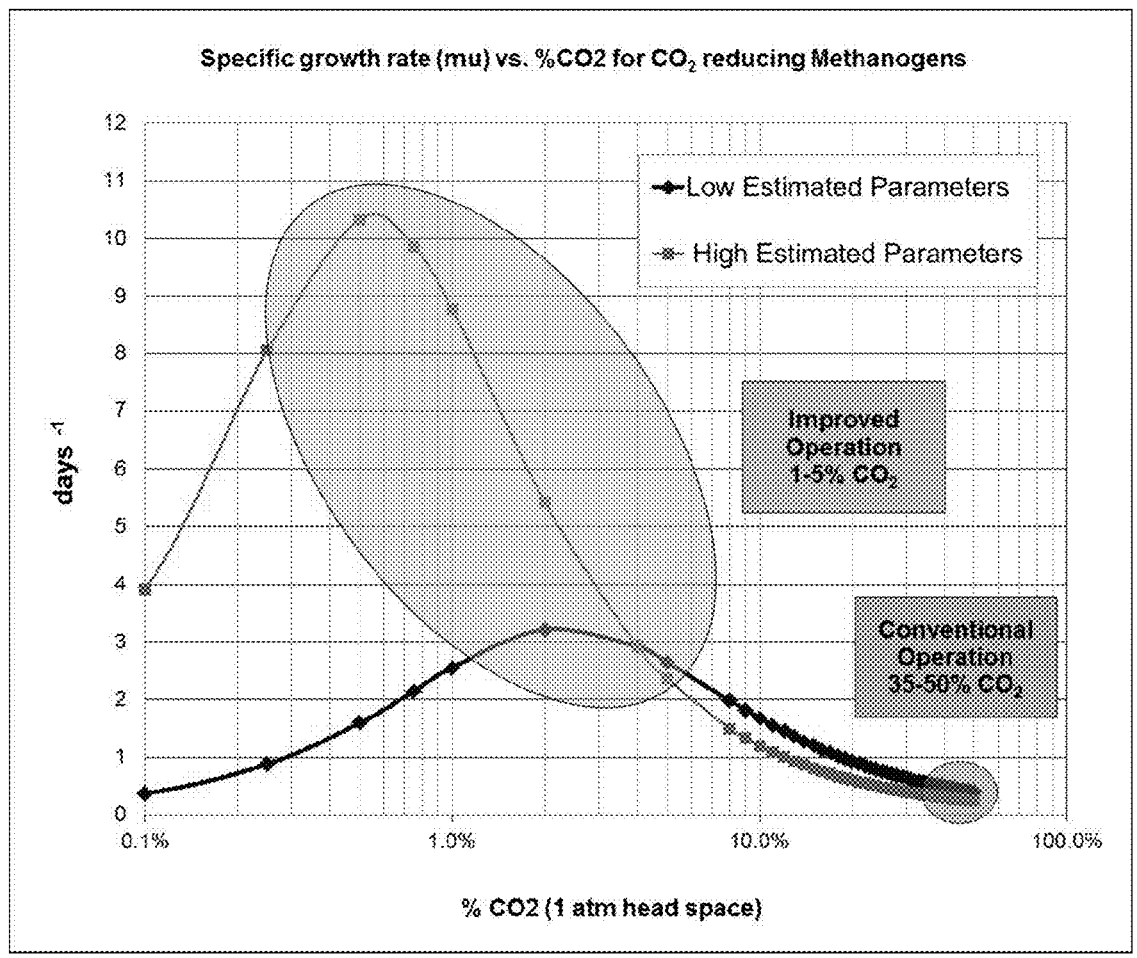
FIG. 8 is a graph showing Andrew's equation for $CO_2$-reducing methanogens in anaerobic digesters operated at 35° C. As shown in the graph, improved operating conditions are observed when the optimal gas $CO_2$ concentrations are between about 1% to about 10%.

The estimated parameters for the Andrew's equation for the methanogens show agreement with the specific growth rate used by environmental engineers (FIG. 7). The Andrew's equation for methanogens suggests that higher rates of biogas formation are possible by reducing the gas phase $CO_2$ concentration below 10% (FIGS. 5 and 6 for 0% and 20% $CO_2$, respectively). FIG. 8 provides guidance on the effect of gas phase $CO_2$ concentrations, and therefore soluble $CO_2$ concentrations, on the specific growth rate of the methanogens. Optimal $CO_2$ concentrations are calculated at near 1% in the gas phase (FIG. 8). Most practitioners are more aware of gas phase concentrations of $CO_2$ (and $CH_4$) than the soluble $CO_2$ concentration. The soluble or dissolved $CO_2$ concentration is directly related to the gas phase $CO_2$ concentration by Henry's constant. By optimizing the gas phase $CO_2$ that is in contact with the reactor contents, the gas phase and soluble phase $CO_2$ concentration adjust to be in equilibrium with the Henry's constant, temperature and headspace pressure, thus the removal of $CO_2$ from the gas phase will reduce the gas phase and soluble phase $CO_2$ concentrations.

It is important to note that all microbes are sensitive to pH and the Andrew's equation can be combined with a Monod term for pH that will be more accurate in describing the specific growth rate.

$$\mu obs = \mu max \times \frac{[CO2]}{[CO2] + Ks, CO2 + \frac{[CO2]^2}{Ki, CO2}} \times \frac{1}{\left(1 + \frac{[H+]}{K1} + \frac{K2}{[H+]}\right)} - b \quad (eq\ 2)$$

In the Monod term for pH, [H$^+$] represents the proton concentration and $K_1$ and $K_2$ represent the pH factor range limits for growth. $K_1$ represents the lower pH limit and $K_2$ represents the upper pH limit. For example, if the pH factor is set for a range of pH between about 6 and about 8 then $K_1$ would be 10$^{-6}$ and $K_2$ would be 10$^{-8}$. For Anammox bacteria the suggested pH range is between about 6.7 and about 8.3. Methanogens have been observed to grow at a very broad pH range of between a pH of about 3 to about 9. The methanogens in the anaerobic digesters have a pH range of about 6 to about 8, similar to the Anammox bacteria.

For anaerobic digesters that do not generate high levels of volatile fatty acids, neutral pH (about 6.8- about 8) will be the normal range and the dissolved $CO_2$ will be the key parameter for optimal operation and performance. The pH of the solution is impacted by the carbonate system and the volatile fatty acids level. In general, the higher gas phase (and therefore soluble) $CO_2$ concentrations will lower the pH of the solution. By stripping gas phase or soluble phase $CO_2$ from the system, the pH should increase.

Rapid growth of SRB with the optimization of the soluble $CO_2$ may also present an opportunity to treat the sewage sludges in an anaerobic digester with a very short HRT with the express purpose of generating the bulk of the hydrogen sulfide ($H_2S$). The retention time depends on the specific growth rate of the SRB. It is generally thought by those in the field that the SRB outcompete with the methanogens for $H_2$ based on thermodynamic considerations. The SRB are also autotrophic and grow faster at optimal $CO_2$ concentrations. A short HRT is only necessary to remove the sulfate or other sulfur containing compounds that can be reduced to hydrogen sulfide. The HRT depends on the maximum specific growth rate of the SRB and the sulfate concentration. The $H_2S$-rich gas could be flared and the bulk of the remaining undigested sewage sludges would be available for anaerobic digestion to methane and $CO_2$. This approach would separate the bulk of the $H_2S$ from the biogas and reduce the corrosion on biogas handling equipment, since $H_2S$ forms sulfuric acid in the moist biogas.

Figure 9:
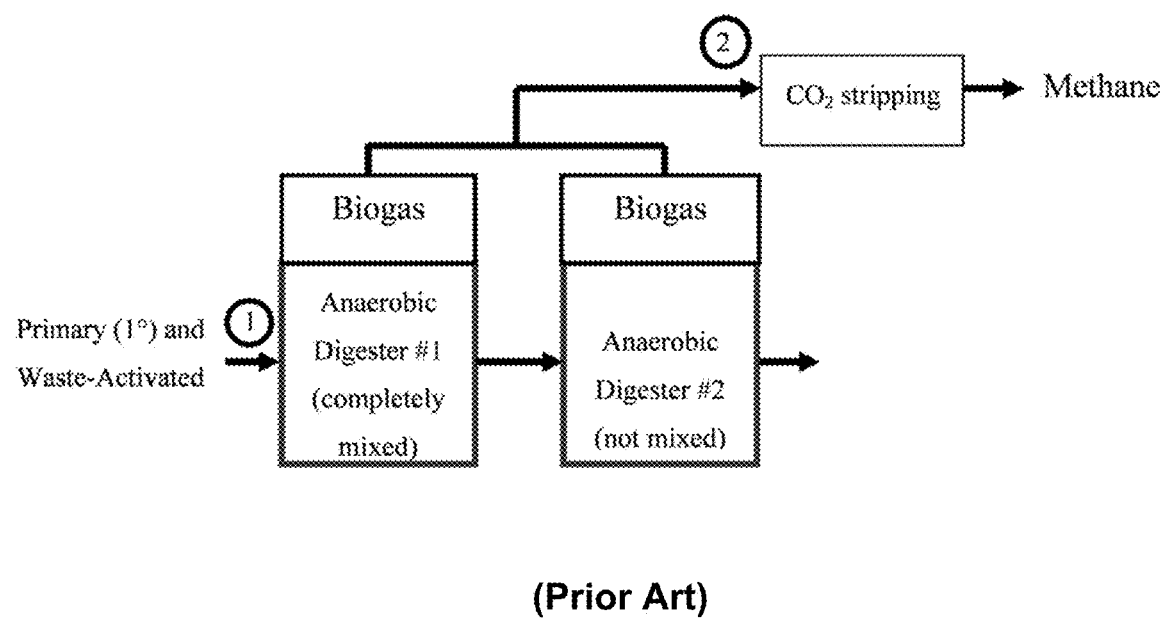
FIG. 9 is a diagram of a standard anaerobic digestion processes for a conventional 2-Stage Anaerobic Digester.
Figure 10:
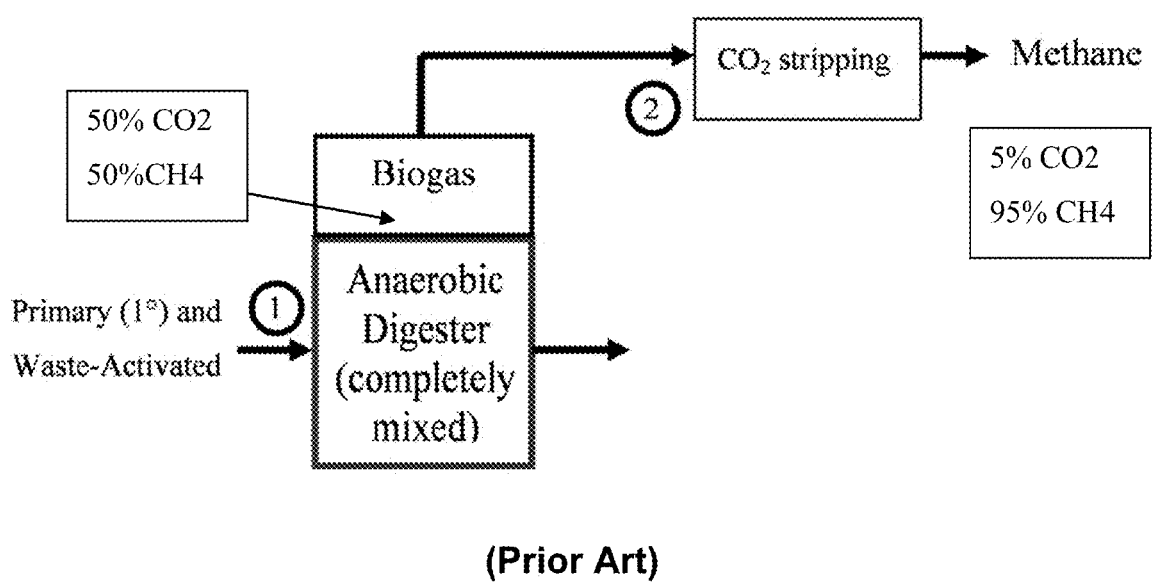
FIG. 10 is a diagram of a standard anaerobic digestion processes for a high-rate anaerobic digester.
Figure 11:
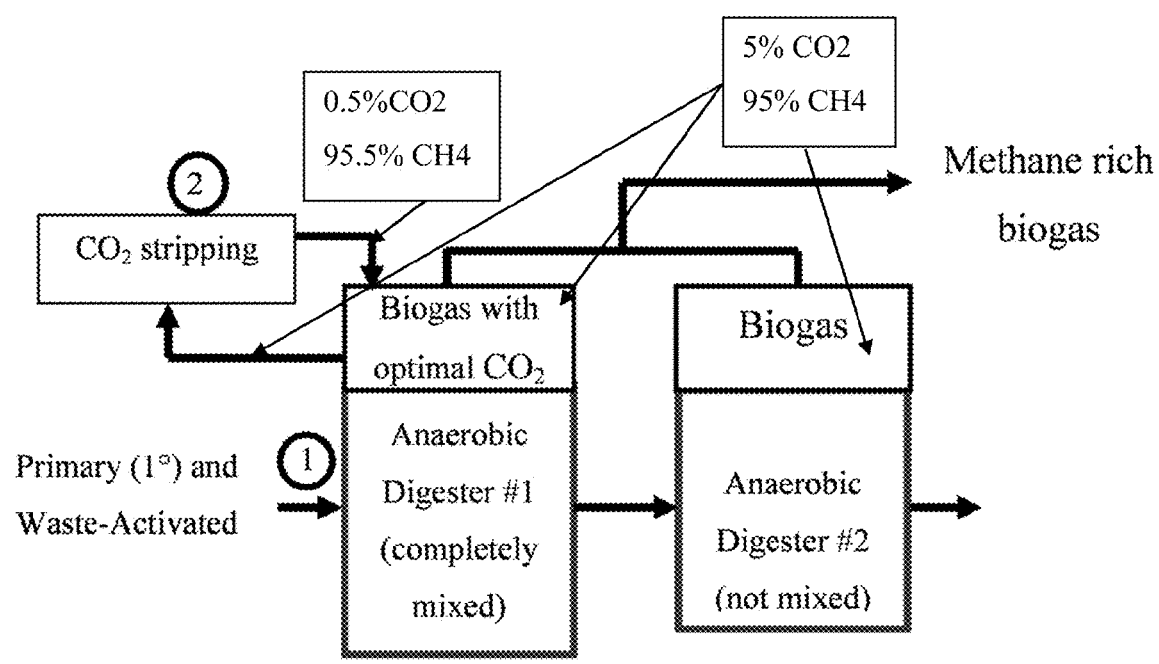
FIG. 11 is a diagram of the improved anaerobic digestion processes for a conventional 2-Stage Anaerobic Digester.
Figure 12:
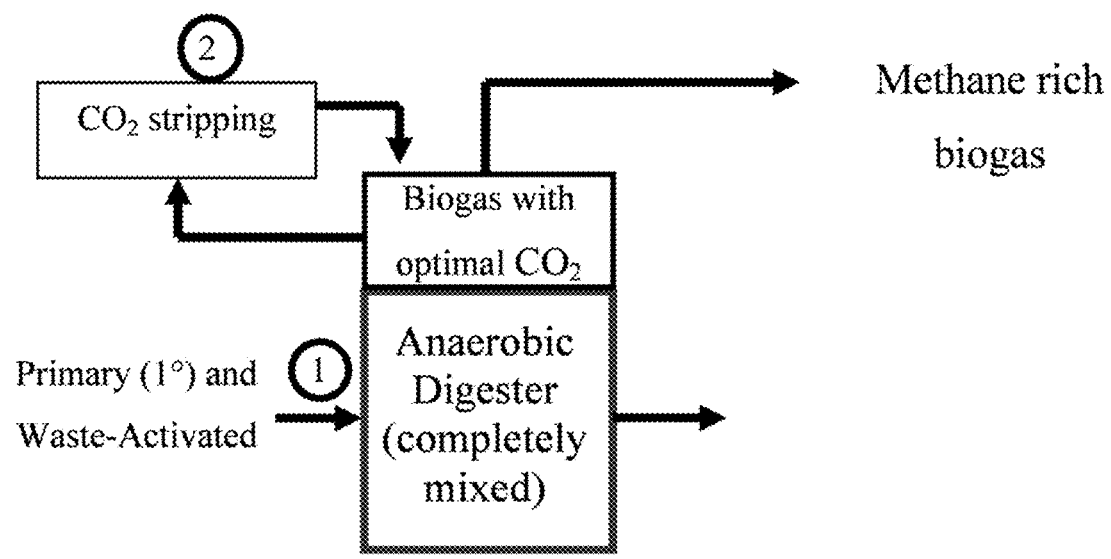
FIG. 12 is a diagram of the improved anaerobic digestion processes for a high-rate anaerobic digester.

Traditional anaerobic digestion is a stirred, low-solids process performed in a continuously-stirred tank reactor (CSTR). Both the conventional and high-rate processes use this design configuration, seen in FIGS. 9 and 10. Currently, there is great interest in generating biomethane, which has a methane content of 95-98% and a corresponding carbon dioxide content of 3-5%. In order to generate biomethane from conventional and high-rate anaerobic digesters, the headspace biogas is passed through a $CO_2$ stripping process. The new anaerobic digestion process is novel in that it repositions the biogas purification process equipment ($CO_2$ stripping) to reduce and optimize the headspace gas phase $CO_2$ concentration, seen in FIGS. 11 and 12. In the new anaerobic digestion process, the $CO_2$ stripping equipment is positioned so that it receives high $CO_2$ biogas from the headspace of the digester. This high $CO_2$ biogas is flowed through $CO_2$ stripping equipment which lowers the concentration of $CO_2$. This biogas with lower % $CO_2$ is then recycled back into the headspace of the anaerobic digester which promotes the growth of the anaerobic bacteria. In FIG. 11, the $CO_2$ stripping process shown is assumed to operate at 90% $CO_2$ removal efficiency and a headspace $CO_2$ target concentration of 5%, which generates biomethane. The size and flow rate of the $CO_2$ stripping process (i.e., capital and operating costs) is dictated by the biogas quality, biogas generation rate of the anaerobic digestion process, and $CO_2$ removal efficiency. Alternatively, this biogas with the lower % $CO_2$ generated by the $CO_2$ stripper may also be used as the feed gas for a gas mixing system. The new invention improves the performance of either configuration. By operating at much lower gas phase $CO_2$ concentration, the anaerobic digester can be fed at higher organic loading rates (i.e., food and paper wastes) for a given SRT or operated at lower SRT for a given organic loading rate. The lower SRT may require other pre- or post-treatments to meet EPA regulations for biosolids. Smaller reactor volume also means that different building materials than pre-stressed concrete can be used. The new process allows for standard sized plastic or metallic tanks. Eliminating excessive reactor size drastically reduces the equipment costs, and as a result, overall capital costs.

It should be noted that the lower SRT that the novel process is designed for is constrained by regulations for class A pathogen reduction (see EPA 40 CFR Part 503 for regulations for land application of biosolids). The process retention time necessitates the use of an alternative method for pathogen reduction like lime treatment of the biosolids. It is also important to note that the dimensions for the reactor size listed here are for domestic/municipal sludge treatment only. Applications involving animal, crop, and other organic wastes may require smaller digesters, and will also likely have different disposal regulations.

Uses other than Wastewater and Sludge Digestion

In addition to the digestion of municipal wastewater sludge, this technology lends itself to a variety of other waste digestion problems in industries. Other applications include swine manure (instead of covered lagoons), poultry waste, crop waste, paper waste, solid waste pre-landfill treatment, cattle waste, industrial waste, high-solid waste, and low value fossil fuels, such as coal and oil. In these types of systems, proper control of the headspace $CO_2$ concentration (i.e., circulation of the headspace gas through a molecular sieve for gas separation or caustic reactor) will reduce and optimize the dissolved $CO_2$ concentration in the bioreactor. Covers (fixed or membrane) are used to maintain anaerobic conditions for the collection of biogas. The $CO_2$ stripper is connected to the biogas enclosure, thus allowing for the transfer of biogas from the headspace into the $CO_2$ stripper, where the biogas with lower $CO_2$ concentration is returned to the headspace. The addition of gas phase $CO_2$ probes can be used with a controller to ensure that the target gas phase $CO_2$ concentration is maintained.

In some cases, intimate mixing of anaerobic microbes with the organic solids may require a dilution of the mixture with anaerobic process water with optimal dissolved $CO_2$ and gas-phase $CO_2$ concentrations. This would be accomplished by adding a small tank using process water prior to the thickening step. After mixing, the process water can be removed by belt-thickening, gravity separation or centrifugation and the high solids mixture of organic solid waste and anaerobic microbes would be anaerobically digested. The high solids anaerobic digester would be operated at the desired temperature (ambient, mesophilic or 35° C., or thermophilic or 55° C.) and optimal gas-phase $CO_2$ concentration. Since thermophilic methanogens are autotrophic and phylogenetically relatives of the mesophilic methanogens, the $CO_2$ sensitivity of the specific growth will be similar to the mesophilic methanogens. Lower headspace $CO_2$ concentrations will provide better growth conditions for the thermophilic methanogens.

The optimal $CO_2$ concentration will be driven by Andrew's equation as well as the capital and operating costs of the system. It may be too expensive to operate at 1% gas phase $CO_2$ concentration. However, any reduction in the current $CO_2$ concentration will allow the anaerobic digestion process to operate more efficiently. In this configuration, mixing would not be necessary and the anaerobic digester would be operated in a plug flow with recycle mode. The optimal gas-phase $CO_2$ concentration would be maintained by continuously removing the $CO_2$ from the biogas in the headspace. The biologically generated biogas coming from the anaerobic digestion process will contain between about 30% to about 50% $CO_2$. The gas phase $CO_2$ concentration continually increases due to the small headspace volume and the generation of biogas with high $CO_2$ levels. Continuously operating the $CO_2$ stripper reduces the $CO_2$ concentration of the processed biogas to near 0%. This "biomethane" is returned to the headspace, which dilutes the headspace biogas concentration of $CO_2$. When the headspace pressure is too high, then some of the biogas from the headspace is removed from the system. The removal of biogas from the headspace is continuous in most full-scale AD, but the quality of the biogas is poor due to the high concentration of $CO_2$. The smaller size and cost of the new system lends itself well to these applications, since conventional systems are cost and size prohibitive for the private user.

For bioreactor landfills that recirculate leachate, coal bed to methane systems that recycle groundwater and add nutrients prior to injection into the subsurface, and other subsurface biogenic methane generation systems, process water (i.e., leachate or groundwater) can be stripped of excess $CO_2$ by an anaerobic stripping system (i.e., oxygen free stripping gas) or aerobic stripping system combined with an anaerobic sparging system (i.e., oxygen free $N_2$ gas) prior to injection into these subsurface systems. These approaches would effectively shift the dissolved $CO_2$ concentration away from the conventional system point and towards the more optimal soluble $CO_2$ concentration for methanogenesis.

These approaches may also be beneficial for soil bioremediation sites, where groundwater is pumped to the surface for ex situ treatment and recycled into the subsurface. Dehalogenating bacteria and methanogens would grow faster in the subsurface when exposed to optimal soluble $CO_2$ concentrations. For conventional landfills that do not utilize leachate recirculation, the separation of gas phase $CO_2$ from the collected biogas can offer an opportunity to recycle the treated biogas with low $CO_2$ content into the landfill gas collection system.

The methods described herein may also be used with anaerobic membrane bioreactors (AMB). AMBs are placed after the primary clarifier (this unit process removes the primary sludge from the wastewater) and before the aeration tank or basin used for nitrification, and used to treat domestic and industrial wastewater. However, these reactors do not operate at the optimal dissolved $CO_2$ concentration. These AMB have enclosed headspaces to ensure anaerobic conditions and collect biogas. The biogas from the AMB could be processed to remove the $CO_2$ in real-time to achieve the optimal gas-phase $CO_2$, using the methods described above. In turn, the biogas with the optimal gas-phase $CO_2$ may be used to aerate the AMB contents in order to increase the rate of methanogenesis. Typical use of AMB has limitations in the treatment of domestic waste water at low temperatures (<15° C.) since low temperatures inhibit methanogenesis. Since both temperature and dissolved $CO_2$ concentration affect the specific growth rate of methanogens as a product (i.e., mu=mu max×temp factor×$CO_2$ factor), the optimal dissolved $CO_2$ concentration offsets the inhibition brought on by low temperature operation, allowing methanogenesis to occur. Thus operation at a lower temperature is possible since the $CO_2$ concentration offsets the temperature. This approach would lower the BOD content of the wastewater, which would reduce aeration costs compared to a conventional activated sludge system. This would also reduce the amount of sludge needed to be treated by the anaerobic digester for additional cost savings.

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of increasing the specific growth rate of anaerobic, autotrophic microbes in a wastewater treatment system comprising:
   optimizing dissolved $CO_2$ further comprising:
   establishing an optimal control value for the soluble $CO_2$ concentration for wastewater;
   measuring the concentration of soluble $CO_2$ for the wastewater;
   comparing the measured concentration of soluble $CO_2$ in the wastewater against the optimal control value; and adjusting the measured concentration of soluble $CO_2$ to match the optimal soluble $CO_2$ control value;

whereby optimizing the soluble $CO_2$ increases the specific growth rate of the bacteria.

2. The method of claim 1, wherein the microbes are Anammox bacteria.

3. The method of claim 1, wherein the microbes are methanogens.

4. The method of claim 1, wherein the optimal control value is established by Equation 1 below:

$$\mu obs = \mu max \times \frac{[CO2]}{[CO2] + Ks, CO2 + \frac{[CO2]^2}{Ki, CO2}} - b \qquad (1)$$

wherein $\mu_{obs}$ is the specific growth rate; $\mu_{max}$ is the maximum specific growth rate, $h^{-1}$; $K_s, CO_2$ is the saturation constant for $CO_2$, mg/L; $K_i, CO_2$ is the inhibition constant for $CO_2$, mg/L; [CO2] is the concentration of $CO_2$; and b or $k_d$ is the decay coefficient.

5. The method of claim 1, wherein the optimal control value is established by Equation 2 below:

$$\mu obs = \mu max \times \frac{[CO2]}{[CO2] + Ks, CO2 + \frac{[CO2]^2}{Ki, CO2}} \times \frac{1}{\left(1 + \frac{[H+]}{K1} + \frac{K2}{[H+]}\right)} - b \qquad (2)$$

wherein $\mu_{obs}$ is the specific growth rate; $\mu_{max}$ is the maximum specific growth rate, $h^{-1}$; $K_s, CO_2$ is the saturation constant for $CO_2$, mg/L; $K_i, CO_2$ is the inhibition constant for $CO_2$, mg/L; [CO2] is the concentration of $CO_2$; b or $k_d$ is the decay coefficient; [H+] is the proton concentration; $K_1$ is the lower pH limit; and $K_2$ is the upper pH limit.

6. The method of claim 1, wherein the soluble $CO_2$ concentration of the wastewater in the aeration tank is adjusted by passing the wastewater through $CO_2$ stripping equipment.

7. The method of claim 1, wherein the soluble $CO_2$ concentration of the wastewater in the aeration tank is adjusted by passing return activated sludge through $CO_2$ stripping equipment.

8. A method of treating wastewater for biochemical oxygen demand (BOD) and nitrogen removal comprising:
   a. flowing wastewater effluent through a first aeration basin;
   b. optimizing $CO_2$ content of the effluent;
   c. flowing at least a portion of the optimized $CO_2$ effluent into a second aeration basin;
   d. flowing the optimized $CO_2$ effluent from steps (b) and (c) into an anaerobic reactor;
   e. flowing the optimized $CO_2$ effluent from the anaerobic reactor into a secondary clarifier; and
   f. recycling at least a portion of wastewater in the secondary clarifier by channeling the wastewater into the first aeration basin.

9. The method of claim 8, wherein the step of optimizing $CO_2$ content of the wastewater further comprises:
   establishing an optimal control value for soluble $CO_2$ concentration for the wastewater effluent in the first aeration basin wherein the optimal control value is established by Equation (1)

$$\mu obs = \mu max \times \frac{[CO2]}{[CO2] + Ks, CO2 + \frac{[CO2]^2}{Ki, CO2}} - b \qquad (1)$$

wherein $\mu_{obs}$ is the specific growth rate; $\mu_{max}$ is the maximum specific growth rate, $h^{-1}$; $K_s, CO_2$ is the saturation constant for $CO_2$, mg/L; $K_i, CO_2$ is the inhibition constant for $CO_2$, mg/L; [CO2] is the concentration of $CO_2$; and b or $k_d$ is the decay coefficient;

or Equation (2)

$$\mu obs = \mu max \times \frac{[CO2]}{[CO2] + Ks, CO2 + \frac{[CO2]^2}{Ki, CO2}} \times \frac{1}{\left(1 + \frac{[H+]}{K1} + \frac{K2}{[H+]}\right)} - b \qquad (2)$$

wherein $\mu_{obs}$ is the specific growth rate; $\mu_{max}$ is the maximum specific growth rate, $h^{-1}$; $K_s, CO_2$ is the saturation constant for $CO_2$, mg/L; $K_i, CO_2$ is the inhibition constant for $CO_2$, mg/L; [CO2] is the concentration of $CO_2$; b or $k_d$ is the decay coefficient; [H+] is the proton concentration; $K_1$ is the lower pH limit; and $K_2$ is the upper pH limit;

measuring a concentration of soluble $CO_2$ for the wastewater effluent in the first aeration basin;

comparing the measured concentration of soluble $CO_2$ in the waste water effluent in the first aeration basin against the optimal control value; and adjusting the soluble $CO_2$ concentration in the first aeration basin to match the optimal soluble $CO_2$ control value.

10. The method of claim 9, wherein the soluble $CO_2$ concentration of the wastewater effluent in the first aeration basin is adjusted by passing the effluent through a $CO_2$ stripping process.

11. The method of claim 9, wherein the soluble $CO_2$ concentration of the wastewater effluent in the first aeration basin is adjusted by passing return activated sludge through a $CO_2$ stripping process.

12. The method of claim 8, wherein the second aeration basin is an ammonium oxidizing bacteria (AOB) reactor.

13. The method of claim 12, wherein the AOB reactor has a pH of at least about 8.

14. The method of claim 8, wherein the anaerobic reactor is an Anammox reactor.

15. The method of claim 14, wherein anaerobic conditions are maintained in the Anammox reactor by internally recycling Anammox effluent to Anammox influent.

16. The method of claim 14, wherein anaerobic conditions are maintained in the Anammox reactor by flowing about 1% of primary solids or raw wastewater into the Anammox reactor.

17. A method of treating wastewater for BOD, nitrogen and phosphorous removal comprising:
   a. flowing a volume of wastewater through a primary clarifier;
   b. optimizing $CO_2$ content of primary effluent exiting the primary clarifier;
   c. flowing the primary effluent having optimized $CO_2$ into an anaerobic basin for phosphorous release;
   d. flowing effluent from step (c) to an aerobic basin to remove BOD;
   e. adding nitrite to the effluent from step (d);
   f. flowing the effluent from step (e) into a second anaerobic basin;
   g. flowing the effluent from step (f) into a secondary clarifier; and
   h. recycling at least a portion of wastewater in the secondary clarifier to provide return activated sludge to the first anaerobic basin.

18. The method of claim 17, wherein the step of optimizing $CO_2$ content of the primary effluent further comprises:
   establishing an optimal control value for soluble $CO_2$ concentration for the primary effluent exiting the primary clarifier wherein the optimal control value is established by Equation (1)

$$\mu obs = \mu max \times \frac{[CO2]}{[CO2] + Ks, CO2 + \frac{[CO2]^2}{Ki, CO2}} - b \quad (1)$$

wherein $\mu_{obs}$ is the specific growth rate; $\mu_{max}$ is the maximum specific growth rate, $h^{-1}$; $K_s,CO_2$ is the saturation constant for $CO_2$, mg/L; $K_i,CO_2$ is the inhibition constant for $CO_2$, mg/L; [CO2] is the concentration of $CO_2$; and b or $k_d$ is the decay coefficient;

or Equation (2)

$$\mu obs = \quad (2)$$
$$\mu max \times \frac{[CO2]}{[CO2] + Ks, CO2 + \frac{[CO2]^2}{Ki, CO2}} \times \frac{1}{\left(1 + \frac{[H+]}{K1} + \frac{K2}{[H+]}\right)} - b$$

wherein $\mu_{obs}$ is the specific growth rate; $\mu_{max}$ is the maximum specific growth rate, $h^{-1}$; $K_s,CO_2$ is the saturation constant for $CO_2$, mg/L; $K_i,CO_2$ is the inhibition constant for $CO_2$, mg/L; [CO2] is the concentration of $CO_2$; b or $k_d$ is the decay coefficient; [H$^+$] is the proton concentration; $K_1$ is the lower pH limit; and $K_2$ is the upper pH limit;

measuring a concentration of soluble $CO_2$ for the primary effluent exiting the primary clarifier;

comparing the measured concentration of soluble $CO_2$ in the primary effluent exiting the primary clarifier against the optimal control value; and adjusting the soluble $CO_2$ concentration of the primary effluent to match the optimal soluble $CO_2$ control value.

19. The method of claim 18, wherein the soluble $CO_2$ concentration of the primary effluent exiting the primary clarifier is adjusted by passing the wastewater through a $CO_2$ stripping process.

20. The method of claim 18, wherein the soluble $CO_2$ concentration of the primary effluent exiting the primary clarifier is adjusted by passing return activated sludge through a $CO_2$ stripping process.

21. The method of claim 17, wherein the second anaerobic basin is an Anammox reactor.

22. The method of claim 21, wherein anaerobic conditions are maintained in the Anammox reactor by internally recycling Anammox effluent to Anammox influent.

23. The method of claim 21, wherein anaerobic conditions are maintained in the Anammox reactor by flowing about 1% of primary solids or raw wastewater into the Anammox reactor.

24. A method of treating wastewater for BOD, nitrogen and phosphorous removal comprising:
a. flowing a volume of wastewater through a primary clarifier wherein phosphorous is removed by allowing the wastewater to occupy the primary clarifier for a sufficient hydraulic residence time (HRT);
b. optimizing $CO_2$ content of at least a portion of primary effluent exiting the primary clarifier;
c. flowing effluent from steps (a) and (b) to an aerobic basin to remove BOD;
d. adding nitrite to the effluent from step (c);
e. flowing the effluent from step (d) into an anaerobic basin;
f. flowing the effluent from step (e) into a secondary clarifier; and
g. recycling at least a portion of wastewater in the secondary clarifier to provide return activated sludge to the primary clarifier.

25. The method of claim 24, wherein the step of optimizing $CO_2$ content of the primary effluent further comprises:

establishing an optimal control value for soluble $CO_2$ concentration for the primary effluent exiting the primary clarifier wherein the optimal control value is established by Equation (1)

$$\mu obs = \mu max \times \frac{[CO2]}{[CO2] + Ks, CO2 + \frac{[CO2]^2}{Ki, CO2}} - b \quad (1)$$

wherein $\mu_{obs}$ is the specific growth rate; $\mu_{max}$ is the maximum specific growth rate, $h^{-1}$; $K_s,CO_2$ is the saturation constant for $CO_2$, mg/L; $K_i,CO_2$ is the inhibition constant for $CO_2$, mg/L; [CO2] is the concentration of $CO_2$; and b or $k_d$ is the decay coefficient;

or Equation (2)

$$\mu obs = \quad (2)$$
$$\mu max \times \frac{[CO2]}{[CO2] + Ks, CO2 + \frac{[CO2]^2}{Ki, CO2}} \times \frac{1}{\left(1 + \frac{[H+]}{K1} + \frac{K2}{[H+]}\right)} - b$$

wherein $\mu_{obs}$ is the specific growth rate; $\mu_{max}$ is the maximum specific growth rate, $h^{-1}$; $K_s,CO_2$ is the saturation constant for $CO_2$, mg/L; $K_i,CO_2$ is the inhibition constant for $CO_2$, mg/L; [CO2] is the concentration of $CO_2$; b or $k_d$ is the decay coefficient; [H$^+$] is the proton concentration; $K_1$ is the lower pH limit; and $K_2$ is the upper pH limit;

measuring a concentration of soluble $CO_2$ for the primary effluent exiting the primary clarifier;

comparing the measured concentration of soluble $CO_2$ in the primary effluent exiting the primary clarifier against the optimal control value; and adjusting the soluble $CO_2$ concentration in the primary effluent to match the optimal soluble $CO_2$ control value.

26. The method of claim 25, wherein the soluble $CO_2$ concentration of the primary effluent exiting the primary clarifier is adjusted by passing the wastewater through a $CO_2$ stripping process.

27. The method of claim 25, wherein the soluble $CO_2$ concentration of the primary effluent exiting the primary clarifier is adjusted by passing return activated sludge through a $CO_2$ stripping process.

28. The method of claim 24, wherein the anaerobic basin is an Anammox reactor.

29. The method of claim 28, wherein anaerobic conditions are maintained in the Anammox reactor by internally recycling Anammox effluent to Anammox influent.

30. The method of claim 28, wherein anaerobic conditions are maintained in the Anammox reactor by flowing about 1% of primary solids or raw wastewater into the Anammox reactor.

31. A wastewater treatment system comprising:
an aerobic treatment zone;
an anaerobic treatment zone wherein the anaerobic treatment zone is positioned downstream from the aerobic treatment zone; and
a $CO_2$ stripping zone wherein the $CO_2$ stripping zone is positioned between the aerobic and anaerobic treatment zones.

32. The system of claim 31, further comprising a recycling zone wherein at least a portion of wastewater in the anaerobic treatment zone is recycled to re-enter the aerobic treatment zone.

33. A wastewater treatment system comprising:
a $CO_2$ stripping zone;
at least one anaerobic treatment zone wherein the anaerobic treatment zone is positioned downstream from the $CO_2$ stripping zone; and
an aerobic treatment zone wherein the aerobic treatment zone is positioned between the $CO_2$ stripping zone and the at least one anaerobic treatment zone.

34. The system of claim 33, further comprising a recycling zone wherein at least a portion of wastewater in the anaerobic treatment zone is recycled to re-enter the anaerobic treatment zone.

35. The system of claim 33, further comprising a recycling zone wherein at least a portion of wastewater in the anaerobic treatment zone is recycled to re-enter the $CO_2$ stripping zone.

36. An anaerobic digestion system comprising:
at least one anaerobic digester having a biogas headspace; and
$CO_2$ stripping equipment positioned adjacent the biogas headspace of the at least one anaerobic digester;
whereby biogas contained in the biogas headspace is cycled through the $CO_2$ stripping equipment and re-enters the biogas headspace with lower $CO_2$ concentration.

37. A method of treating sludge comprising:
flowing sludge through at least one anaerobic digester having a biogas headspace;
cycling headspace biogas from the biogas headspace through $CO_2$ stripping equipment to lower $CO_2$ levels in the headspace biogas; and
flowing the lower $CO_2$ biogas back into the biogas headspace of the at least one anaerobic digester;
whereby the lower $CO_2$ headspace biogas encourages the growth of autotrophic anaerobic microbes.

38. The method of claim 37, wherein the step of optimizing $CO_2$ content of the biogas further comprises:
establishing an optimal control value for gaseous $CO_2$ concentration in the headspace of the at least one anaerobic digester wherein the optimal control value is established by Equation (1)

$$\mu obs = \mu max \times \frac{[CO2]}{[CO2] + Ks, CO2 + \frac{[CO2]^2}{Ki, CO2}} - b \quad (1)$$

wherein $\mu_{obs}$ is the specific growth rate; $\mu_{max}$ is the maximum specific growth rate, $h^{-1}$; $K_s,CO_2$ is the saturation constant for $CO_2$, mg/L; $K_i,CO_2$ is the inhibition constant for $CO_2$, mg/L; [CO2] is the concentration of $CO_2$; and b or $k_d$ is the decay coefficient;

or Equation (2)

$$\mu obs = \mu max \times \frac{[CO2]}{[CO2] + Ks, CO2 + \frac{[CO2]^2}{Ki, CO2}} \times \frac{1}{\left(1 + \frac{[H+]}{K1} + \frac{K2}{[H+]}\right)} - b \quad (2)$$

wherein $\mu_{obs}$ is the specific growth rate; $\mu_{max}$ is the maximum specific growth rate, $h^{-1}$; $K_s,CO_2$ is the saturation constant for $CO_2$, mg/L; $K_i,CO_2$ is the inhibition constant for $CO_2$, mg/L; [CO2] is the concentration of $CO_2$; b or $k_d$ is the decay coefficient; [H$^+$] is the proton concentration; $K_1$ is the lower pH limit; and $K_2$ is the upper pH limit;
measuring a concentration of gaseous $CO_2$ for the biogas in the headspace;
comparing the measured concentration of gaseous $CO_2$ in the biogas in the headspace against the optimal control value; and
adjusting the gaseous $CO_2$ concentration in the headspace to match the optimal gaseous $CO_2$ control value.

39. The method of claim 38, wherein the gaseous $CO_2$ concentration in the headspace is adjusted by stripping $CO_2$ from the biogas.

40. The method of claim 38, further comprising gas-mixing the contents of the at least one anaerobic digester using the lower $CO_2$ biogas.

41. A method of increasing the specific growth rate of anaerobic, autotrophic microbes in a wastewater treatment system comprising:
optimizing soluble $CO_2$ further comprising:
establishing an optimal control value for the soluble $CO_2$ concentration for wastewater;
measuring the concentration of gaseous $CO_2$ for the wastewater wherein the gaseous $CO_2$ concentration is in equilibrium with reactor contents;
comparing the measured concentration of gaseous $CO_2$ against the optimal control value; and
adjusting the measured concentration of gaseous $CO_2$ to match the optimal soluble $CO_2$ control value;
whereby optimizing the soluble $CO_2$ increases the specific growth rate of the bacteria.

42. The method of claim 41, wherein the microbes are Anammox bacteria.

43. The method of claim 41, wherein the microbes are methanogens.

44. The method of claim 41, wherein the optimal control value is established by Equation 1 below:

$$\mu obs = \mu max \times \frac{[CO2]}{[CO2] + Ks, CO2 + \frac{[CO2]^2}{Ki, CO2}} - b \quad (1)$$

wherein $\mu_{obs}$ is the specific growth rate; $\mu_{max}$ is the maximum specific growth rate, $h^{-1}$; $K_s,CO_2$ is the saturation constant for $CO_2$, mg/L; $K_i,CO_2$ is the inhibition constant for $CO_2$, mg/L; [CO2] is the concentration of $CO_2$; and b or $k_d$ is the decay coefficient.

45. The method of claim 41, wherein the optimal control value is established by Equation 2 below:

$$\mu_{obs} = \mu_{max} \times \frac{[CO2]}{[CO2] + K_s, CO2 + \frac{[CO2]^2}{K_i, CO2}} \times \frac{1}{\left(1 + \frac{[H+]}{K1} + \frac{K2}{[H+]}\right)} - b \qquad (2)$$

wherein $\mu_{obs}$ is the specific growth rate; $\mu_{max}$ is the maximum specific growth rate, $h^{-1}$; $K_s, CO_2$ is the saturation constant for $CO_2$, mg/L; $K_i, CO_2$ is the inhibition constant for $CO_2$, mg/L; [CO2] is the concentration of $CO_2$; b or $k_d$ is the decay coefficient; [H$^+$] is the proton concentration; $K_1$ is the lower pH limit; and $K_2$ is the upper pH limit.

46. The method of claim 41, wherein the soluble $CO_2$ concentration of the wastewater in the aeration tank is adjusted by passing the wastewater through $CO_2$ stripping equipment.

47. The method of claim 41, wherein the soluble $CO_2$ concentration of the wastewater in the aeration tank is adjusted by passing return activated sludge through $CO_2$ stripping equipment.

\* \* \* \* \*